(12) United States Patent
Malott et al.

(10) Patent No.: US 12,473,942 B2
(45) Date of Patent: Nov. 18, 2025

(54) WOOD SCREW

(71) Applicant: THE HILLMAN GROUP, INC., Cincinnati, OH (US)

(72) Inventors: Dale G. Malott, Gilbert, AZ (US); Farhad Lajewardi, Toronto (CA)

(73) Assignee: THE HILLMAN GROUP, INC., Forest Park, OH (US)

( * ) Notice: Subject to any disclaimer, the term of this patent is extended or adjusted under 35 U.S.C. 154(b) by 171 days.

(21) Appl. No.: 18/185,794

(22) Filed: Mar. 17, 2023

(65) Prior Publication Data
US 2023/0220867 A1    Jul. 13, 2023

Related U.S. Application Data

(63) Continuation-in-part of application No. 17/699,536, filed on Mar. 21, 2022, now Pat. No. 12,085,107.

(60) Provisional application No. 63/321,895, filed on Mar. 21, 2022, provisional application No. 63/167,809, filed on Mar. 30, 2021.

(51) Int. Cl.
*F16B 25/00* (2006.01)

(52) U.S. Cl.
CPC ...... *F16B 25/0015* (2013.01); *F16B 25/0052* (2013.01); *F16B 25/0068* (2013.01)

(58) Field of Classification Search
CPC  F16B 35/065; F16B 25/0052; F16B 25/0057; F16B 25/0015; F16B 25/0068
USPC ........... 411/399, 311, 386, 387.1, 387.2, 412
See application file for complete search history.

(56) References Cited

U.S. PATENT DOCUMENTS

| | | | |
|---|---|---|---|
| 471,179 A | * | 3/1892 | Jones ...................... F16B 4/004 411/424 |
| 1,151,861 A | | 8/1915 | Brumback |
| 2,200,227 A | * | 5/1940 | Olson ................. F16B 25/0052 411/386 |
| 2,263,137 A | | 11/1941 | Oestereicher |
| 3,093,028 A | | 6/1963 | Mathie |
| 3,125,923 A | | 3/1964 | Hanneman |
| 3,136,205 A | | 6/1964 | Ansingh |
| 3,207,023 A | | 9/1965 | Knohl |
| 3,238,836 A | | 3/1966 | Johnson |
| 3,246,556 A | | 4/1966 | Phipard, Jr. |

(Continued)

FOREIGN PATENT DOCUMENTS

DE    9216791    4/1994
DE    102007024240    11/2008

(Continued)

*Primary Examiner* — Flemming Saether
(74) *Attorney, Agent, or Firm* — THOMPSON HINE LLP

(57) ABSTRACT

A wood screw includes a head end, a shank and a tapered end, the head end including a tool engaging part, the head end located at a first end of the shank and the tapered end located at a second end of the shank. A thread is formed along the shank. The head end includes a neck running from the first end of the shank to a head cap, wherein the head cap includes an underside facing the tapered end, wherein the underside includes a plurality of serrations extending around the underside, each serration having a leading face and a trailing face that define a cutting edge, wherein the trailing face of each serration tapers away from the tapered end. A reaming section may be provided between the thread and the head end. The thread may include a notch configuration. The thread may be a dual start thread.

17 Claims, 25 Drawing Sheets

(56) References Cited

U.S. PATENT DOCUMENTS

| | | | |
|---|---|---|---|
| 3,710,676 A | 1/1973 | Ringland | |
| RE28,111 E | 8/1974 | Laverty | |
| 3,903,784 A | 9/1975 | Dekker | |
| 3,933,075 A | 1/1976 | Peterson | |
| 3,937,119 A | 2/1976 | Ernst | |
| 3,942,405 A * | 3/1976 | Wagner | F16B 25/0084 |
| | | | 411/386 |
| 3,965,793 A | 6/1976 | Roser | |
| 4,060,020 A | 11/1977 | Poliak | |
| 4,125,050 A | 11/1978 | Schwartzman | |
| 4,222,689 A | 9/1980 | Fujiwara | |
| 4,323,326 A | 4/1982 | Okada | |
| 4,407,620 A | 10/1983 | Shinjo | |
| 4,516,893 A | 5/1985 | Barth | |
| 4,536,117 A | 8/1985 | Yamashiro | |
| 4,568,229 A | 2/1986 | Hulsey | |
| 4,586,862 A | 5/1986 | Yamasaki | |
| 4,655,661 A | 4/1987 | Brandt | |
| 4,697,969 A | 10/1987 | Sparkes | |
| 4,705,441 A | 11/1987 | Arnold | |
| 4,749,319 A | 6/1988 | Sygnator | |
| 4,764,066 A | 8/1988 | Terrell | |
| 4,781,506 A | 11/1988 | Roberts | |
| 4,787,792 A | 11/1988 | Jesson | |
| 4,797,045 A | 1/1989 | Lautenschlager, Jr. | |
| 5,061,136 A | 10/1991 | Dixon | |
| 5,249,882 A | 10/1993 | Nagoshi | |
| 5,273,373 A | 12/1993 | Pouyer | |
| 5,294,227 A * | 3/1994 | Forster | F16B 25/10 |
| | | | 411/386 |
| 5,304,023 A | 4/1994 | Toback | |
| 5,356,253 A | 10/1994 | Whitesell | |
| 5,490,700 A | 2/1996 | Zuckerman | |
| 5,516,248 A | 5/1996 | DeHaitre | |
| 5,540,531 A | 7/1996 | Choiniere | |
| 5,683,217 A | 11/1997 | Walther | |
| 5,722,376 A | 3/1998 | Sweeten | |
| 5,739,983 A | 4/1998 | Shigemoto | |
| 5,772,376 A * | 6/1998 | Konig | F16B 35/065 |
| | | | 411/188 |
| 5,827,030 A | 10/1998 | Dicke | |
| 5,882,161 A | 3/1999 | Birkelbach | |
| 5,897,280 A | 4/1999 | Dicke | |
| 5,957,646 A | 9/1999 | Giannuzzi | |
| D418,048 S | 12/1999 | Chan | |
| 6,015,252 A | 1/2000 | Peck | |
| 6,106,208 A | 8/2000 | Lin | |
| 6,113,331 A | 9/2000 | Grossberndt | |
| 6,152,666 A | 11/2000 | Walther | |
| 6,213,700 B1 | 4/2001 | Everard | |
| 6,250,866 B1 | 6/2001 | Devine | |
| 6,254,327 B1 | 7/2001 | Chen | |
| 6,294,751 B1 | 9/2001 | Gall | |
| 6,322,307 B1 * | 11/2001 | Glover | F16B 25/0047 |
| | | | 411/423 |
| 6,332,741 B1 | 12/2001 | Janusz | |
| 6,334,748 B1 * | 1/2002 | Gudjonsson | F16B 25/0015 |
| | | | 411/399 |
| 6,394,725 B1 | 5/2002 | Dicke | |
| 6,394,726 B1 | 5/2002 | Garvick | |
| 6,402,448 B1 | 6/2002 | Dicke | |
| 6,428,259 B1 | 8/2002 | Yu | |
| 6,443,680 B1 | 9/2002 | Bodin | |
| 6,444,950 B1 | 9/2002 | Altekruse | |
| 6,616,391 B1 | 9/2003 | Druschel | |
| 6,666,638 B2 | 12/2003 | Craven | |
| 6,698,987 B1 | 3/2004 | Dicke | |
| 6,699,421 B2 | 3/2004 | Shimizu | |
| 6,702,537 B2 | 3/2004 | Neuhengen | |
| 6,722,830 B2 | 4/2004 | Forster | |
| 6,726,420 B2 | 4/2004 | Ward | |
| 6,789,989 B2 | 9/2004 | Walther | |
| 6,789,991 B2 | 9/2004 | Hsu | |
| 6,926,484 B2 | 8/2005 | Kram | |
| 6,933,465 B2 | 8/2005 | Bankstahl | |
| 6,941,635 B2 | 9/2005 | Craven | |
| 6,966,737 B2 | 11/2005 | McGovern | |
| 6,974,289 B2 | 12/2005 | Levey | |
| 7,037,059 B2 | 5/2006 | Dicke | |
| 7,070,376 B1 | 7/2006 | Toback | |
| 7,101,132 B2 | 9/2006 | Hofschneider | |
| 7,101,133 B2 | 9/2006 | Dicke | |
| 7,118,317 B2 | 10/2006 | Hofschneider | |
| 7,207,248 B2 | 4/2007 | Panasik | |
| 7,255,523 B2 | 8/2007 | Laan | |
| D552,977 S | 10/2007 | He | |
| 7,293,947 B2 | 11/2007 | Craven | |
| 7,326,014 B2 | 2/2008 | Levey | |
| 7,334,976 B2 | 2/2008 | Dicke | |
| 7,377,734 B2 | 5/2008 | Bechtel, Jr. | |
| 7,399,150 B2 | 7/2008 | Hofschneider | |
| 7,402,016 B2 | 7/2008 | Yin-Feng | |
| 7,402,109 B2 | 7/2008 | Bechtel, Jr. | |
| 7,517,182 B2 | 4/2009 | Cabrele | |
| 7,604,445 B1 | 10/2009 | Dicke | |
| 7,677,854 B2 | 3/2010 | Langewiesche | |
| 7,682,118 B2 | 3/2010 | Gong | |
| 7,682,119 B2 | 3/2010 | Chen | |
| 7,682,182 B2 | 3/2010 | Kondo | |
| 7,695,228 B2 | 4/2010 | Craven | |
| 7,699,569 B2 | 4/2010 | Su | |
| 7,785,055 B2 | 8/2010 | Dicke | |
| 7,862,279 B2 | 1/2011 | Stiebitz | |
| 7,862,280 B2 | 1/2011 | Su | |
| 7,874,113 B2 | 1/2011 | Eberle, III | |
| D643,279 S | 8/2011 | Crane | |
| 7,988,396 B2 | 8/2011 | Weiss | |
| 8,104,248 B2 | 1/2012 | Gillis | |
| 8,137,042 B2 | 3/2012 | Severns | |
| 8,192,123 B2 | 6/2012 | Ernst | |
| 8,348,571 B2 | 1/2013 | Shih | |
| 8,348,575 B2 | 1/2013 | Walther | |
| 8,360,702 B2 | 1/2013 | Yu | |
| 8,382,414 B2 | 2/2013 | Vandenberg | |
| 8,408,855 B2 | 4/2013 | Stiebitz | |
| 8,408,856 B2 | 4/2013 | Ernst | |
| 8,419,332 B2 | 4/2013 | Kochheiser | |
| 8,430,618 B2 | 4/2013 | Baer | |
| 8,480,342 B2 | 7/2013 | Stiebitz | |
| 8,511,958 B2 | 8/2013 | Chang | |
| 8,555,597 B2 | 10/2013 | Walther | |
| 8,591,159 B2 | 11/2013 | Walther | |
| 8,740,531 B2 | 6/2014 | Su | |
| 8,789,809 B2 | 7/2014 | Lehmann | |
| 8,858,145 B2 | 10/2014 | Su | |
| 8,864,430 B2 | 10/2014 | Su | |
| 8,864,431 B2 | 10/2014 | Su | |
| 8,944,734 B2 | 2/2015 | Su | |
| 9,046,121 B2 | 6/2015 | Walther | |
| D733,546 S | 7/2015 | Balzhiser | |
| 9,086,088 B2 | 7/2015 | Walther | |
| 9,115,746 B2 | 8/2015 | Mair | |
| 9,145,911 B2 | 9/2015 | Shih | |
| 9,163,654 B2 | 10/2015 | Barenski, Jr. | |
| 9,377,045 B2 | 6/2016 | Su | |
| 9,482,258 B2 * | 11/2016 | Park | F16B 25/0063 |
| 9,494,179 B2 | 11/2016 | Langewiesche | |
| 9,518,599 B2 | 12/2016 | Tapata | |
| 9,581,183 B2 | 2/2017 | Lajewardi | |
| 9,630,729 B2 | 4/2017 | Samaras | |
| 9,683,592 B2 * | 6/2017 | Wang | F16B 25/0052 |
| 9,822,810 B2 | 11/2017 | Su | |
| 9,856,901 B2 | 1/2018 | Dill | |
| 9,970,470 B2 | 5/2018 | Shih | |
| D823,102 S | 7/2018 | Camilleri | |
| D828,148 S | 9/2018 | Camilleri | |
| 10,197,087 B2 | 2/2019 | Hargis | |
| D854,404 S * | 7/2019 | Wang | D8/387 |
| 10,473,134 B2 * | 11/2019 | Walworth | F16B 35/06 |
| 10,480,559 B2 | 11/2019 | Park | |
| 10,626,909 B2 * | 4/2020 | Huang | F16B 25/0057 |
| 10,954,986 B2 | 3/2021 | Ruhmann | |
| 10,954,989 B2 | 3/2021 | Lucas | |

(56) References Cited

U.S. PATENT DOCUMENTS

| | | |
|---|---|---|
| 10,982,703 B2 | 4/2021 | Lajewardi |
| 11,009,059 B2 | 5/2021 | Hubmann |
| 11,149,776 B2 | 10/2021 | Hu |
| 11,181,138 B2 | 11/2021 | Park |
| 11,359,661 B2 * | 6/2022 | Dissing ............... F16B 35/041 |
| 11,391,314 B2 | 7/2022 | Chen |
| D996,962 S | 8/2023 | Schwartzkopf |
| 2001/0005474 A1 | 6/2001 | Chen |
| 2001/0038781 A1 | 11/2001 | Mallet |
| 2002/0127085 A1 | 9/2002 | Field |
| 2003/0021653 A1 | 1/2003 | Takasaki |
| 2004/0018069 A1 | 1/2004 | Lai |
| 2004/0071524 A1 | 4/2004 | Habermehl |
| 2004/0096293 A1 | 5/2004 | Tadich |
| 2005/0226701 A1 | 10/2005 | Craven |
| 2006/0140740 A1 * | 6/2006 | Lin ................. F16B 25/0068 411/386 |
| 2006/0207204 A1 | 9/2006 | Wasitis |
| 2007/0036632 A1 | 2/2007 | Lin |
| 2007/0065252 A1 | 3/2007 | Su |
| 2007/0172333 A1 | 7/2007 | Tsau |
| 2007/0237606 A1 | 10/2007 | Takasaki |
| 2007/0269287 A1 | 11/2007 | Runge |
| 2008/0014047 A1 | 1/2008 | Dohi |
| 2008/0031705 A1 | 2/2008 | Severns |
| 2008/0145182 A1 | 6/2008 | Gstach |
| 2009/0028665 A1 | 1/2009 | Chang |
| 2009/0047096 A1 | 2/2009 | Lin |
| 2009/0110515 A1 | 4/2009 | Chen |
| 2009/0269163 A1 | 10/2009 | Huang |
| 2010/0129175 A1 | 5/2010 | Wunderlich |
| 2010/0158634 A1 | 6/2010 | Walther |
| 2011/0014007 A1 | 1/2011 | Gaudron |
| 2011/0064540 A1 | 3/2011 | Walther |
| 2011/0176888 A1 | 7/2011 | Gaudron |
| 2011/0188966 A1 | 8/2011 | Tsai |
| 2011/0217145 A1 | 9/2011 | Kochheiser |
| 2012/0063865 A1 | 3/2012 | Huang |
| 2012/0186067 A1 | 7/2012 | Walther |
| 2012/0207564 A1 | 8/2012 | Kochheiser |
| 2012/0251268 A1 | 10/2012 | Yu |
| 2012/0294693 A1 | 11/2012 | Gonciarz |
| 2013/0011214 A1 | 1/2013 | Lin |
| 2013/0039720 A1 | 2/2013 | Shih |
| 2013/0047414 A1 | 2/2013 | Werthwein |
| 2013/0058735 A1 * | 3/2013 | Yu ....................... F16B 25/0073 411/386 |
| 2013/0089389 A1 | 4/2013 | Gong |
| 2013/0302110 A1 | 11/2013 | Park |
| 2014/0064878 A1 | 3/2014 | Su |
| 2014/0178150 A1 | 6/2014 | Su |
| 2014/0294534 A1 | 10/2014 | Park |
| 2014/0314522 A1 | 10/2014 | Lin |
| 2015/0050101 A1 | 2/2015 | Shih |
| 2015/0052735 A1 | 2/2015 | Kochheiser |
| 2015/0063947 A1 * | 3/2015 | Huang ................. F16B 35/065 411/393 |
| 2015/0147137 A1 | 5/2015 | Ban |
| 2015/0176623 A1 | 6/2015 | Vogel |
| 2015/0184685 A1 | 7/2015 | Su |
| 2016/0032956 A1 | 2/2016 | Wu |
| 2016/0146241 A1 | 5/2016 | Eckert |
| 2016/0238053 A1 | 8/2016 | Lajewardi |
| 2016/0265578 A1 | 9/2016 | Lin |
| 2016/0273573 A1 | 9/2016 | Hill |
| 2016/0290381 A1 | 10/2016 | Park |
| 2016/0290382 A1 | 10/2016 | Dill |
| 2017/0122356 A1 | 5/2017 | Lajewardi |
| 2017/0152881 A1 | 6/2017 | Yang |
| 2017/0284447 A1 | 10/2017 | Falkenstein |
| 2018/0080491 A1 | 3/2018 | Scheerer |
| 2018/0202479 A1 | 7/2018 | Krueger |
| 2019/0063480 A1 | 2/2019 | Lajewardi |
| 2019/0136897 A1 | 5/2019 | Lajewardi |
| 2019/0203756 A1 | 7/2019 | Langewiesche |
| 2019/0309784 A1 | 10/2019 | Lajewardi |
| 2019/0390700 A1 | 12/2019 | Iyer |
| 2020/0173481 A1 | 6/2020 | Lajewardi |
| 2022/0056942 A1 | 2/2022 | Dissing |

FOREIGN PATENT DOCUMENTS

| | | |
|---|---|---|
| EP | 1207312 | 5/2002 |
| EP | 2458233 | 5/2012 |
| EP | 2811182 | 12/2014 |
| EP | 3569878 A1 | 11/2019 |
| GB | 1357720 | 6/1974 |
| JP | 2010116949 A | 5/2010 |
| WO | WO-2007073326 | 6/2007 |
| WO | WO-2019086091 A | 5/2019 |

* cited by examiner

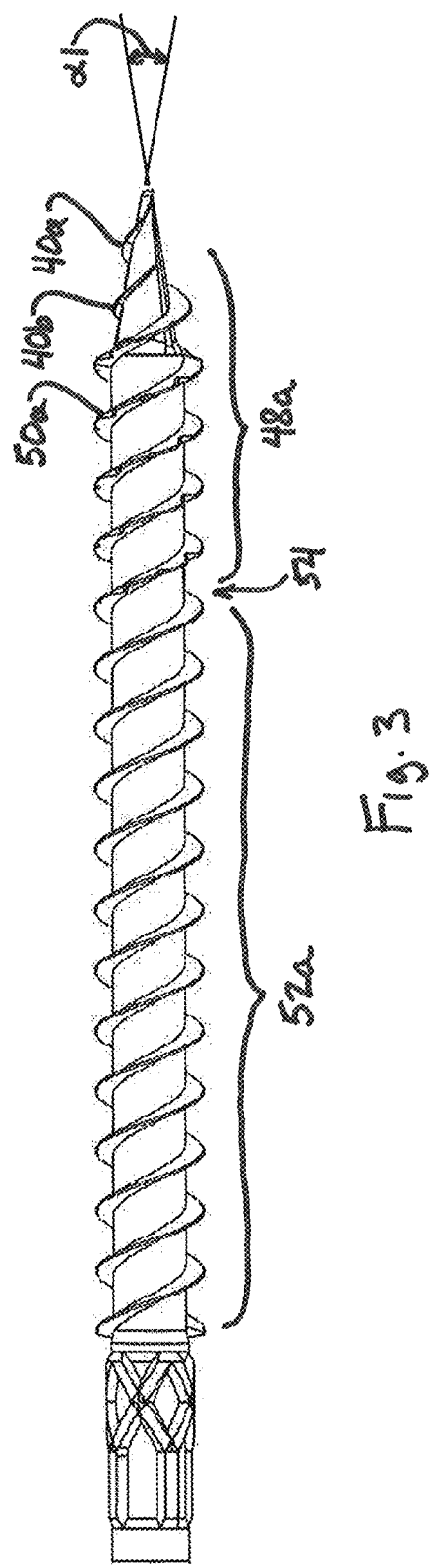

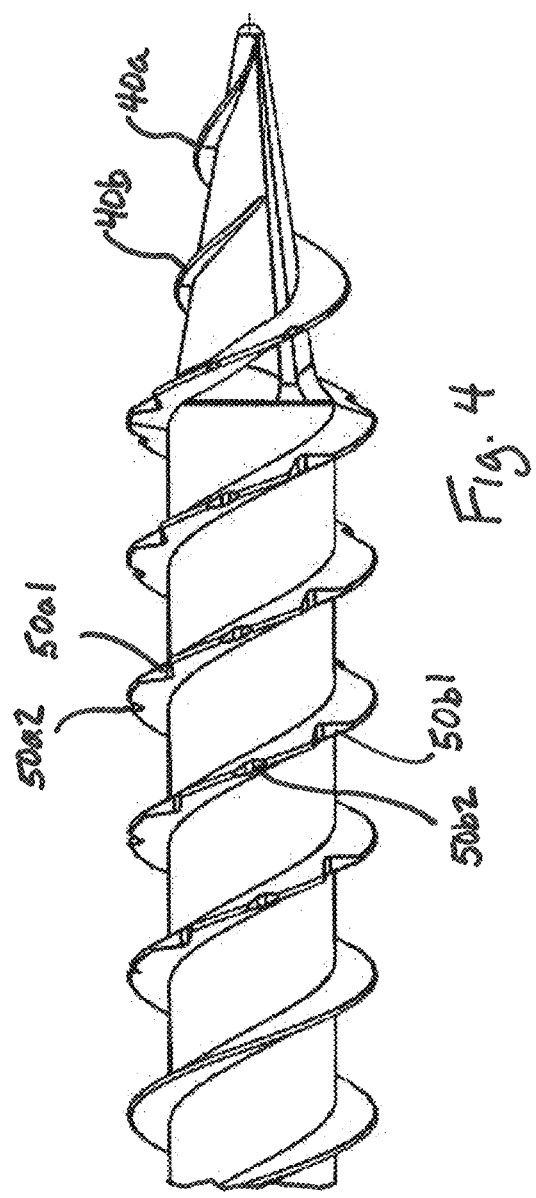

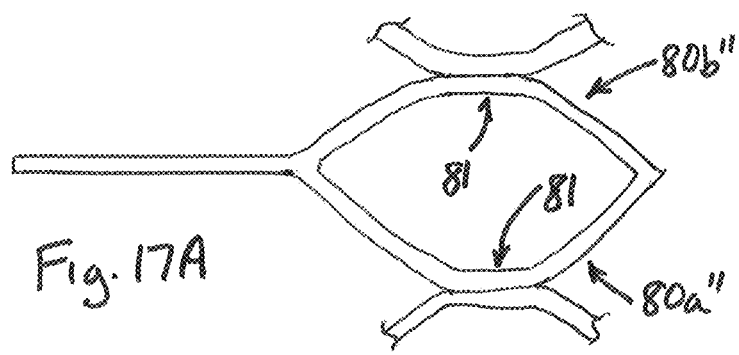

WOOD SCREW

TECHNICAL FIELD

This application relates generally to threaded fasteners and, more particularly, to a wood screw for use in decking and similar applications.

BACKGROUND

A typical screw configuration includes an elongated shank that extends between a driving head of the screw and a pointed end of the screw. At least part of the shank is helically threaded. Contractors installing wood screws regularly encounter issues with excessive torque required to install, which requires more work by the operator and reduces battery life in the case of battery powered screw guns. Contractors also seek the ability to reduce the time needed to drive such screws. In addition, improved performance in wood screws is regularly sought, including pull through performance and thread strength.

It would be desirable to provide a wood screw configuration that addresses one or more of such issues.

SUMMARY

In one aspect, a wood screw includes a head end, a shank and a tapered end, the head end including a tool engaging part, the head end located at a first end of the shank and the tapered end located at a second end of the shank. A thread is formed along the shank, wherein the thread begins on the tapered end, extends onto the shank and terminates at a first axial location along the shank that is spaced from the head end. A reaming section is located along the shank and running from proximate to the first axial location and toward the head end, the reaming section including projections thereon, wherein the reaming section comprises a first segment with a repeating pattern of rotationally leading wedge projections and rotationally trailing wedge projections.

In another aspect, a wood screw includes a head end, a shank and a tapered end, the head end including a tool engaging part, the head end located at a first end of the shank and the tapered end located at a second end of the shank. A thread is formed along the shank, wherein the thread begins on the tapered end, extends onto the shank and toward the head end. The head end includes a neck running from the first end of the shank to a head cap, wherein the head cap includes an underside facing the tapered end, wherein the underside includes a plurality of serrations extending around the underside, each serration having a leading face and a trailing face that define a cutting edge, wherein the trailing face of each serration tapers away from the tapered end.

In a further aspect, a wood screw includes a head end, a shank and a tapered end, the head end including a tool engaging part, the head end located at a first end of the shank and the tapered end located at a second end of the shank. A thread is formed along the shank, wherein the thread begins on the tapered end, extends onto the shank and toward the head end. The thread includes a peripheral edge, and an initial axial segment comprising multiple thread turns and along which the peripheral edge includes a plurality of notches, and a following axial segment comprising multiple thread turns and along which the peripheral edge lacks any notches, wherein the plurality of notches along the initial axial segment includes first notches having a first radial depth and second notches having a second radial depth that is less than the first radial depth.

In another aspect, a wood screw includes a head end, a shank and a tapered end, the head end including a tool engaging part, the head end located at a first end of the shank and the tapered end located at a second end of the shank. A thread is formed along the shank, wherein the thread begins on the tapered end, extends onto the shank and toward the head end. The thread is a dual start thread formed by a first thread and a second thread, wherein the first thread begins on the tapered end and the second thread begins on the tapered end, wherein the second thread begins on the tapered end and is rotationally offset from the first thread by one-hundred eighty degrees.

The details of one or more embodiments are set forth in the accompanying drawings and the description below. Other features, objects, and advantages will be apparent from the description and drawings, and from the claims.

BRIEF DESCRIPTION OF THE DRAWINGS

FIGS. 3 and 4 show partial side elevation views of the screw;

FIGS. 17, 17A and 18-20 shows further alternative embodiments of the reaming section;

FIG. 32 shows an alternative reaming section configuration.

DETAILED DESCRIPTION

Figure 1:
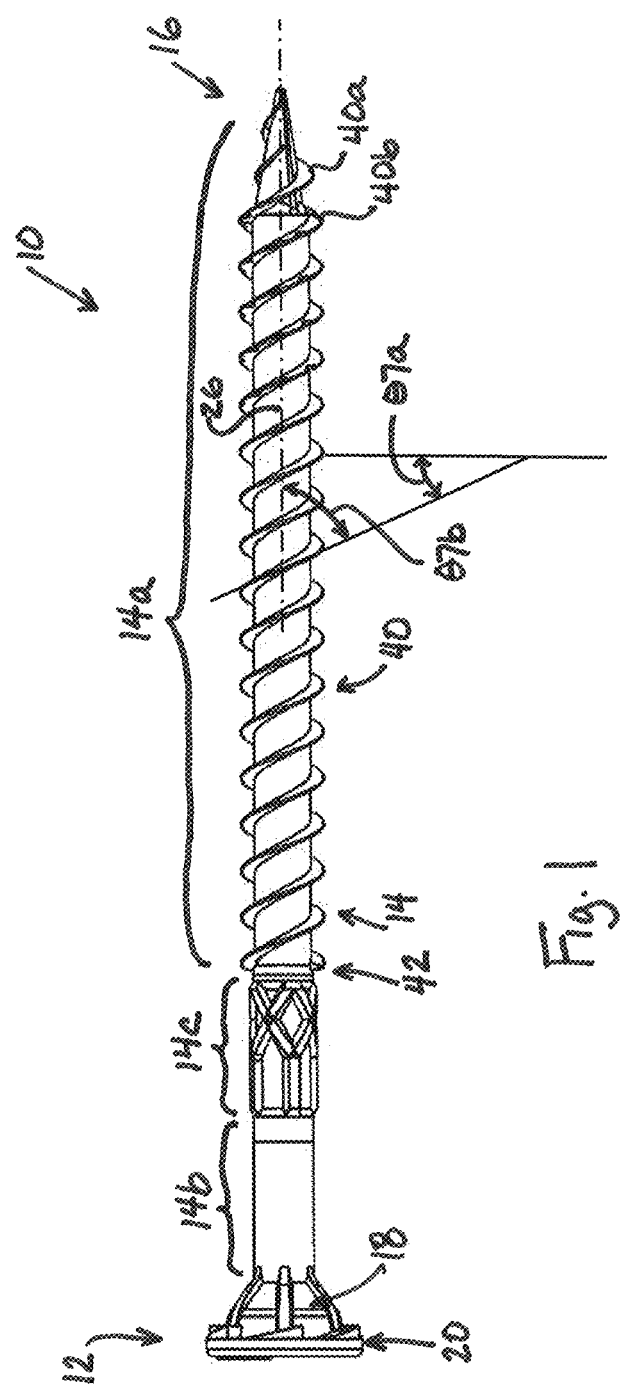
FIG. 1 shows a side elevation view of one embodiment of a wood screw.
Figure 2:
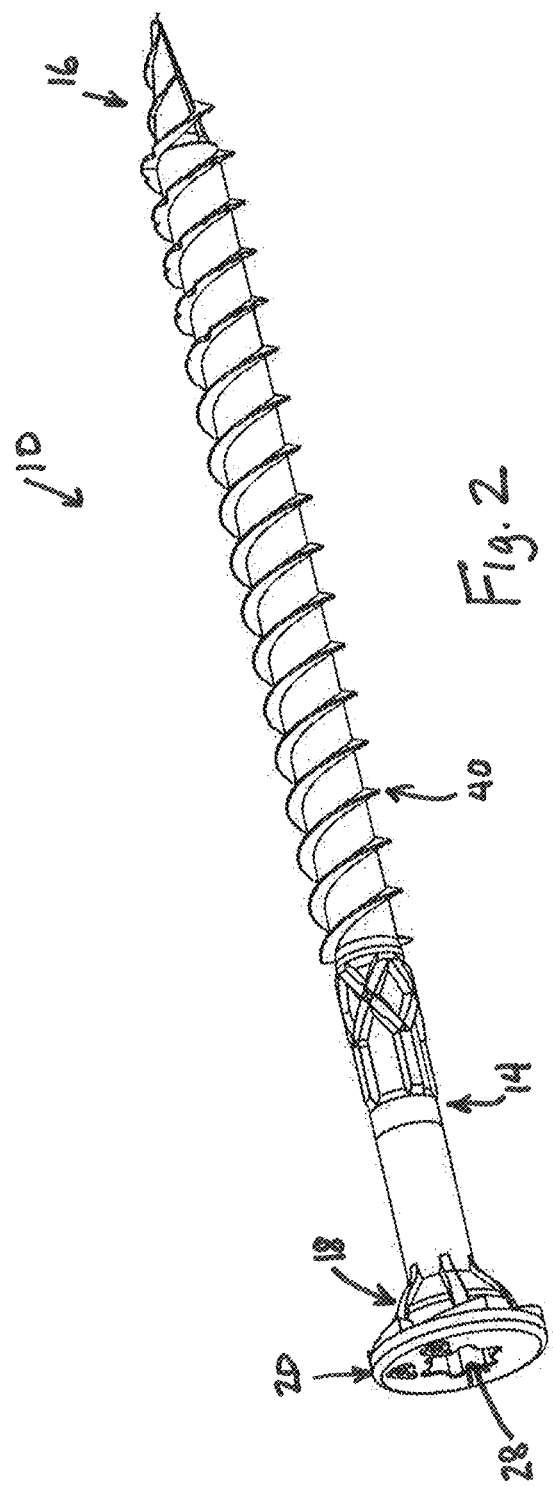
FIG. 2 shows a perspective view of the screw.
Figure 5A:
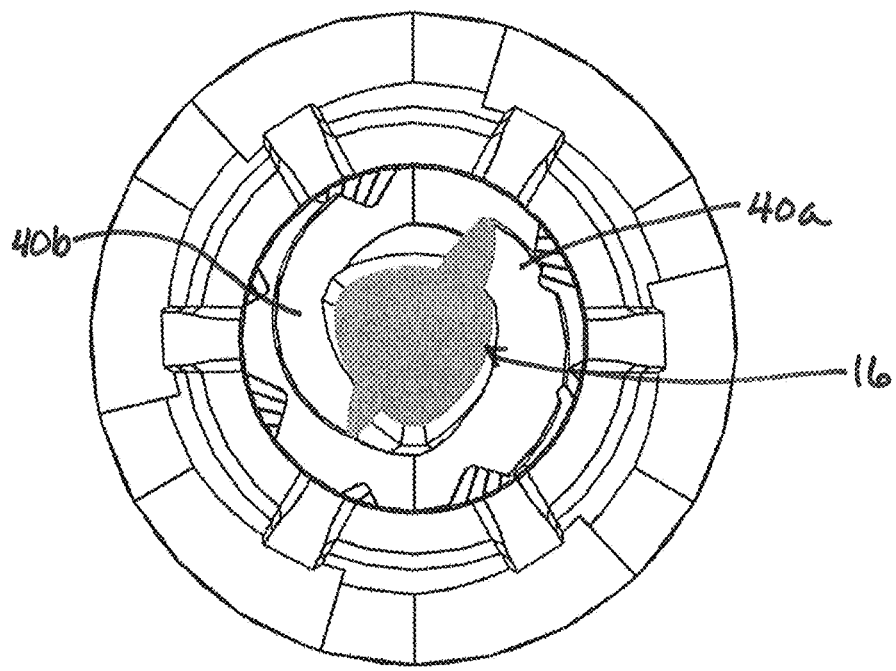
FIGS. 5A and 5B show alternative exemplary cross-sections taken along the tapered end of the screw, and looking toward the head end of the screw, in planes perpendicular to the axis of the screw.
Figure 5B:
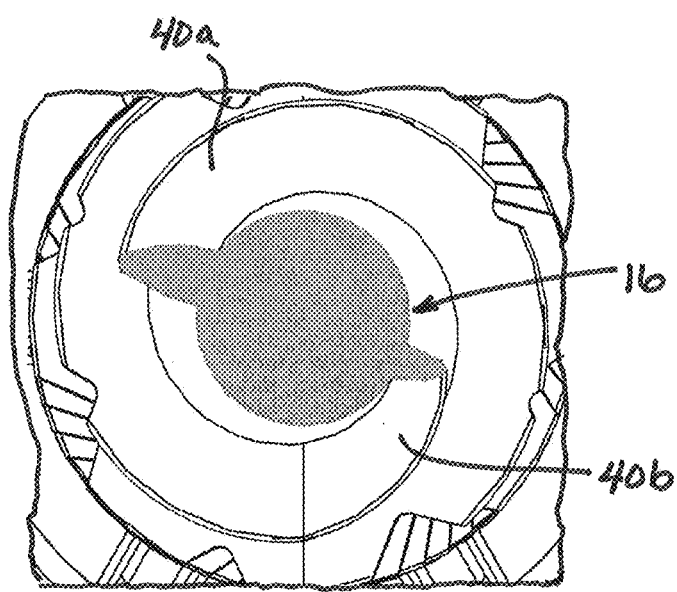
Figure 6:
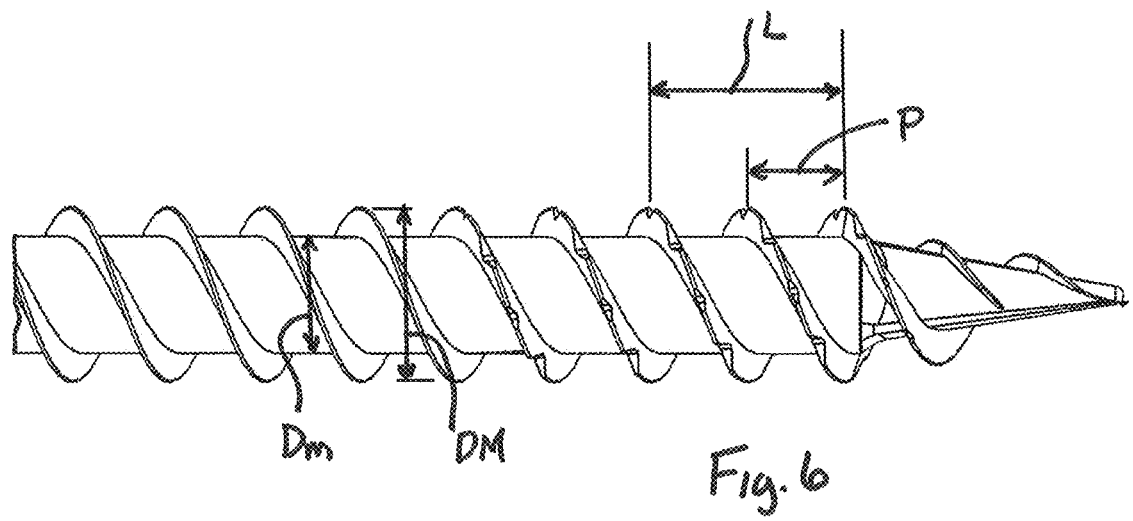
FIG. 6 shows a partial side elevation view of the screw.
Figure 7:
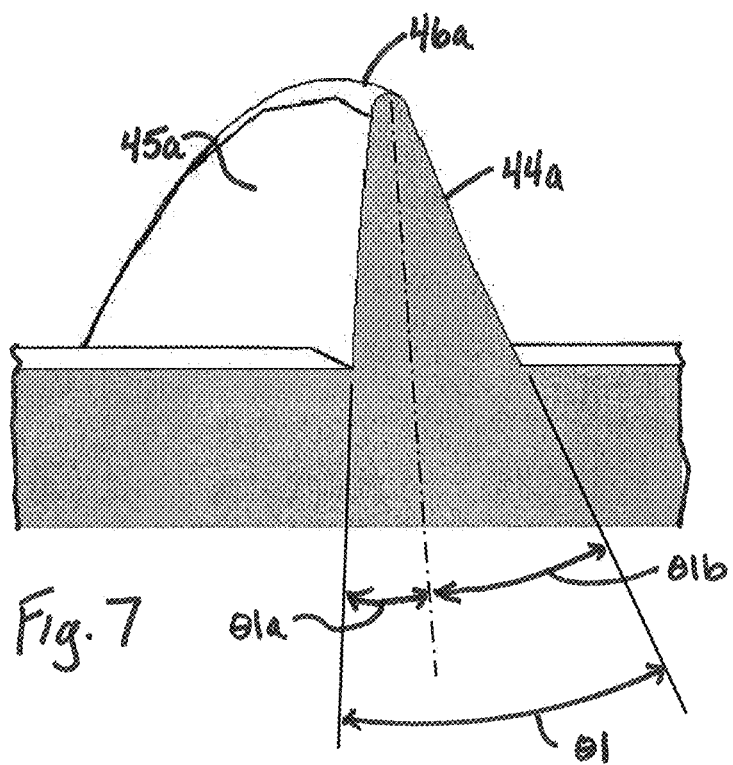
FIG. 7 shows a cross-section of a thread segment of the screw taken along a plane in which the screw axis lies.
Figure 8A:
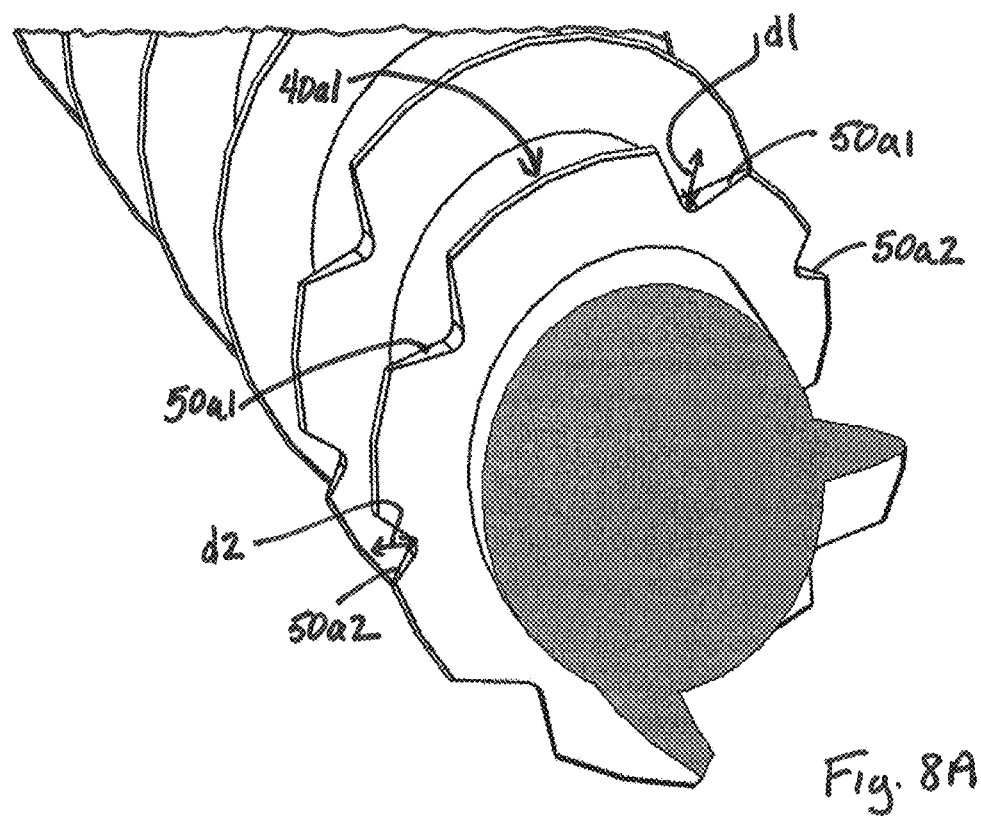
FIGS. 8A and 8B show cross-sections taken along the shank of the screw, and looking toward the head end of the screw, in a plane that is offset from perpendicular to the axis of the screw.
Figure 8B:
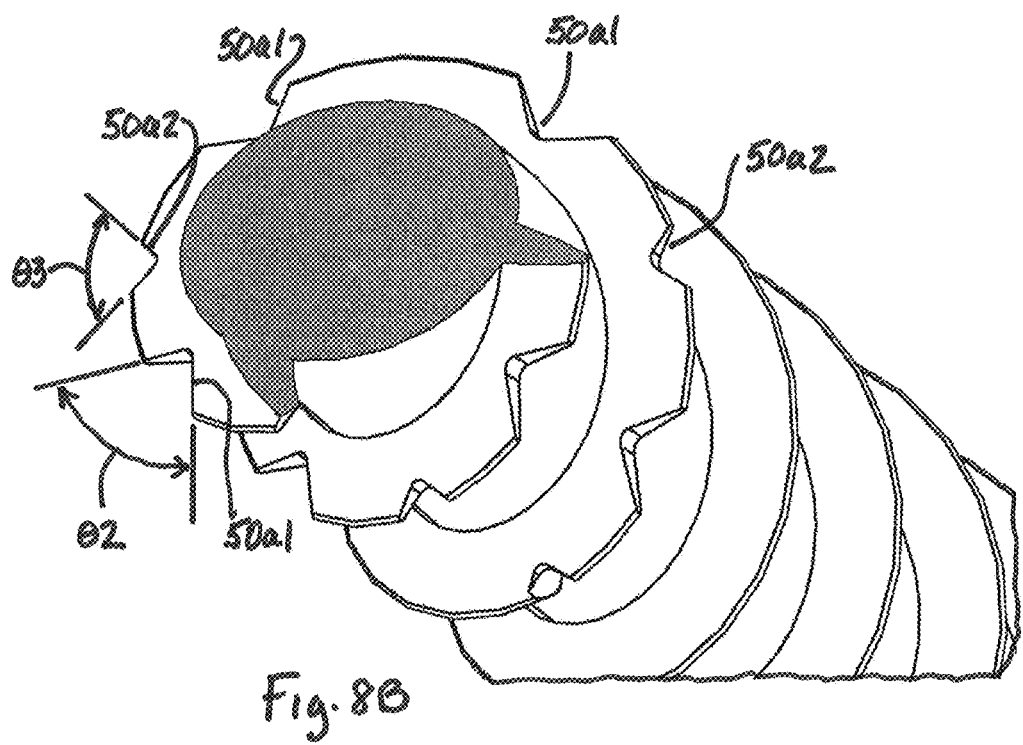
Figure 9:
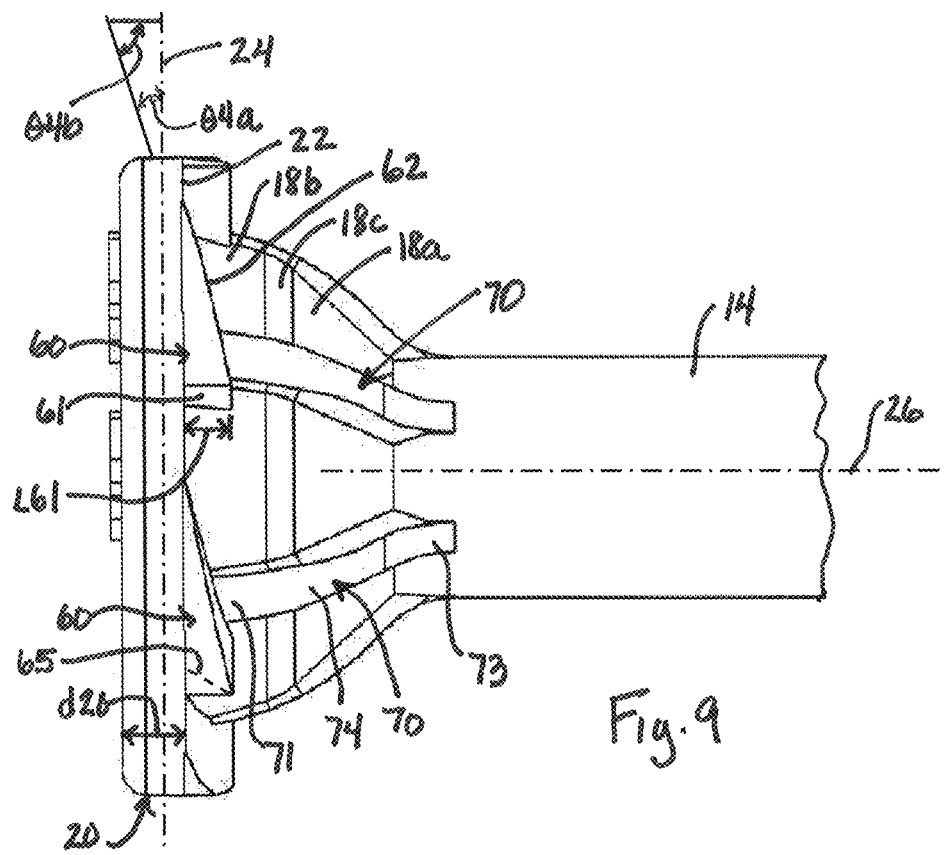
FIGS. 9-13 show views of the head end of the screw.
Figure 10:
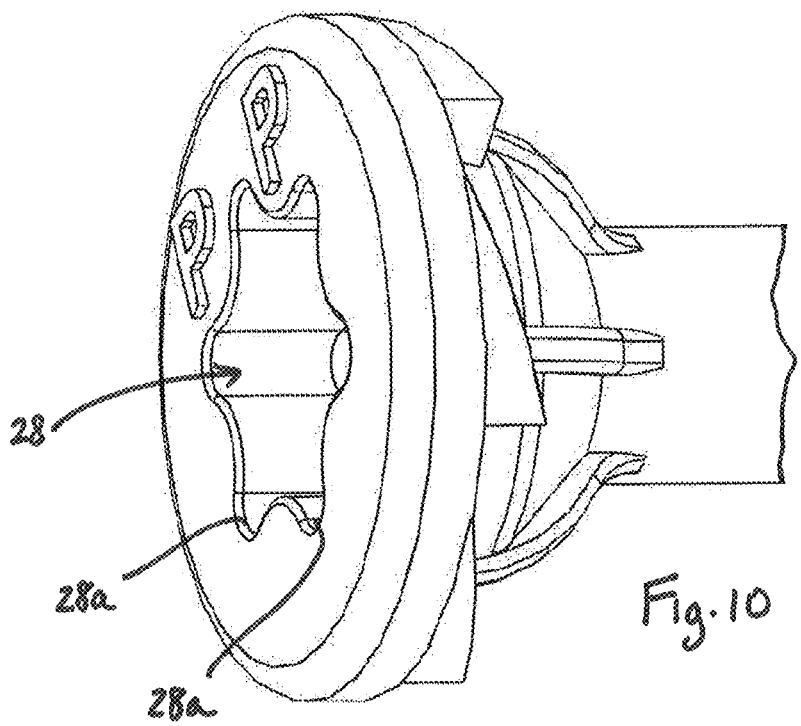
Figure 11:
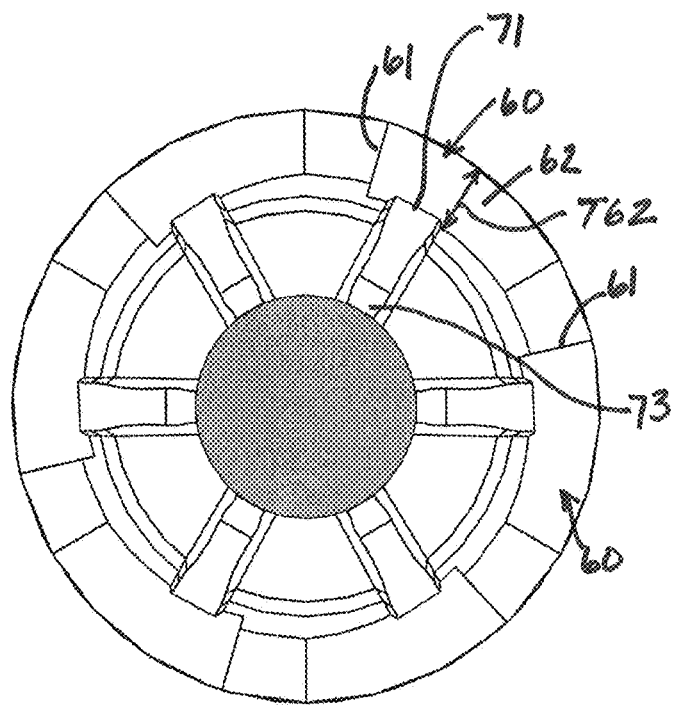
Figure 12:
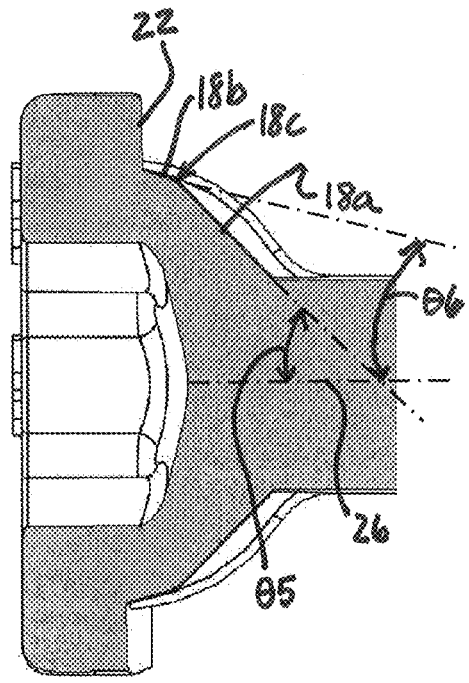
Figure 13:
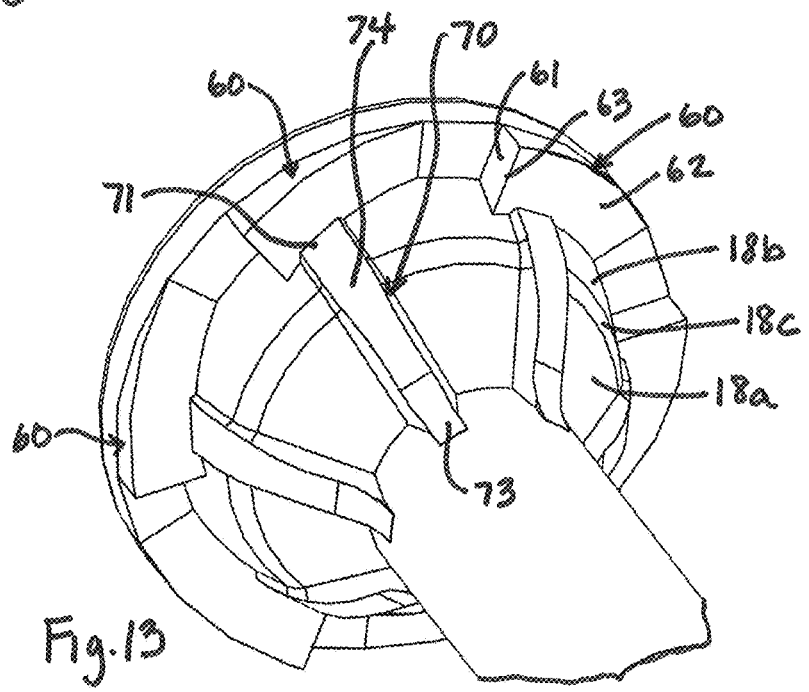
Figure 14A:
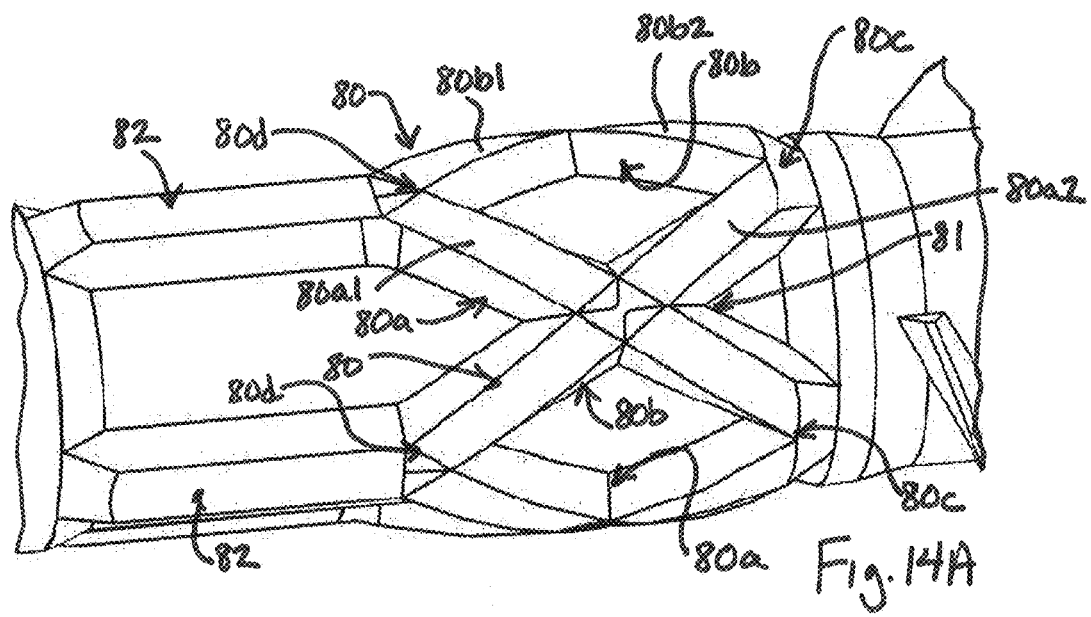
FIGS. 14A and 14B show a reaming section of the screw.
Figure 14B:
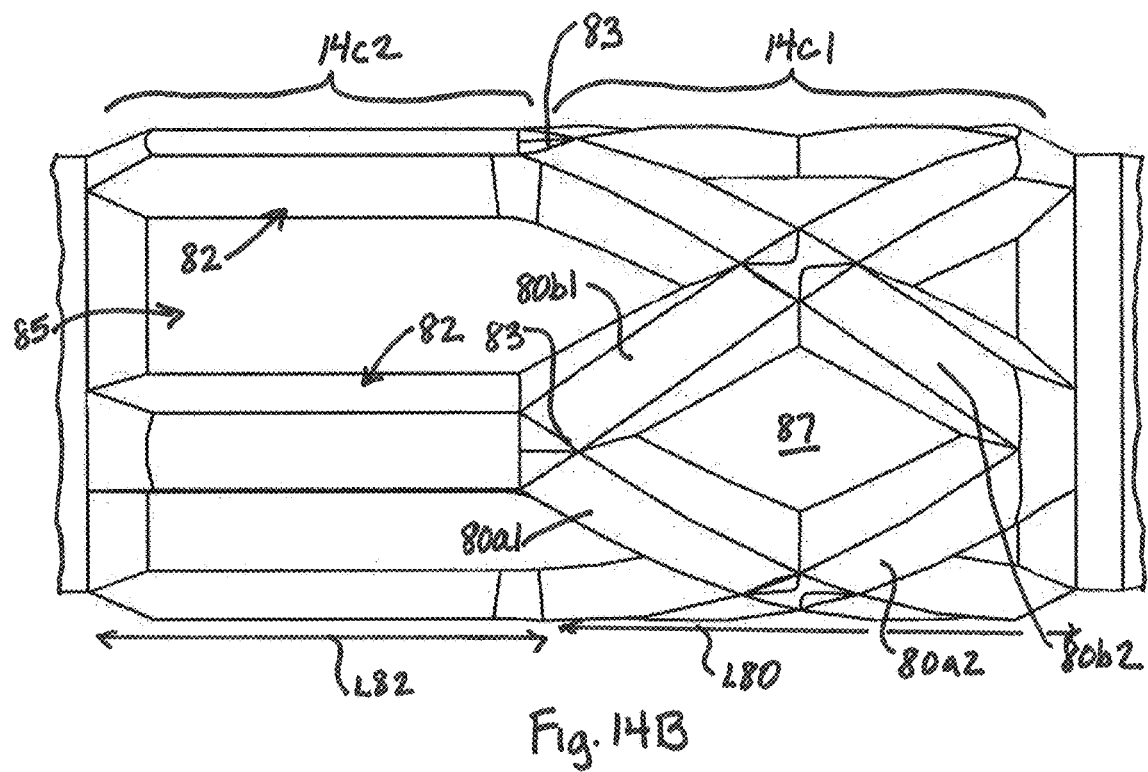

Referring to FIGS. 1-14B, one embodiment of a wood screw 10 is shown. The wood screw includes a head end 12, a shank or core 14 and a tapered end 16, with the head end 12 at one end of the shank 14 and the tapered end 16 at the opposite end of the shank 14 and terminating in a pointed tip. As used herein, the term shank refers to the elongated core or shaft of the screw, which can include threaded and unthreaded portions or segments. The tip angle or point angle α1 may be between nineteen degrees and twenty-three degrees.

The head end 12 includes a neck section 18 running from the end of the shank to a head cap 20, where the neck includes frustoconical segments 18a and 18b. A chamfer or curved segment 18c may form the transition between segments 18a and 18b. The head cap 20 defines an annular ledge 22 facing the tapered end 16 and lying in a plane 24 that is perpendicular to a central axis 26 of the shank 14. An end face of the head cap includes a tool engaging part 28, here in the form of a drive recess with radially outward extending drive lobes 28a. The head cap 20 includes a thickness or axial depth d20, and the outer surface of the head cap may be cylindrical or slightly frustoconical. The core of the tapered end 16 of the screw may be out of round in cross-section, per the tri-lobular shape of FIG. 5A. Alternatively, the core of the tapered end 16 may be round in cross-section per FIG. 5B.

The shank 14 includes threaded axial segment 14a and an unthreaded axial segment 14b, as well as an intermediate reaming section 14c. Here, the diameter of unthreaded axial segment 14b is slightly larger than a diameter of the threaded axial segment 14a. A thread 40 is formed along the shank, and begins on the tapered end 16, extends onto the shank 14 and terminates at an axial location 42 that is spaced from the head end 12. Advantageously, the thread 40 is a multiple start thread (aka multiple lead thread), here a dual start thread, formed by a pair of helical threads 40a and 40b. The helical threads 40a and 40b are of similar configuration, but are rotationally offset from each other by one-hundred eighty degrees, with thread 40a starting at or adjacent to the tip of the screw and with thread 40b starting at a location spaced axially from the tip of the screw (by the pitch distance P) but, here, still on the tapered end 16, with the start location of thread 40b is in circumferential alignment with the start location of thread 40a. Variations where the threads 40a and 40b both start near the tip of the screw are also possible. The description below regarding the configuration of helical thread 40a is understood to equally apply to the helical thread 40b.

The helical thread 40a includes a leading flank 44a, a trailing flank 45a and a peripheral edge 46a joining the leading flank and the trailing flank. The helical thread 40a includes an initial axial segment 48a, comprising multiple thread turns, and along which the peripheral edge 46a includes a plurality of notches 50a, and a following axial segment 52a, comprising multiple thread turns, and along which the peripheral edge 46a lacks any notches. The initial segment 48a begins on the tapered end 16 and runs to an axial location 54 along the shank 14 that is between the tapered end 16 and the axial location 42. The helical thread 40a is an asymmetric angle thread, with a total thread angle $\theta 1$ of between twenty-five degrees and thirty-five degrees (e.g., between 27 degrees and 31 degrees, such as between 28 degrees and 30 degrees). By way of example, the trailing flank angle $\theta 1a$ may be smaller than the leading flank angle $\theta 1b$ (e.g., $\theta 1a/\theta 1b = 0.35$ to $0.55$). In some embodiments, the angle of the thread could be symmetric (e.g., trailing flank angle same as leading flank angle).

The helical threads 40a, 40b include a major diameter DM, a minor diameter Dm, a pitch P and a lead L. Because thread 40 is a dual start thread, the lead L of the thread is twice the pitch P. In exemplary embodiments, the screw threads include the dimensions according to Table 1 below.

TABLE 1

Exemplary Screw Thread Dimensions
(All dimensions in inches)

| Example # | DM | Dm | P | L |
| --- | --- | --- | --- | --- |
| 1 (#12) | 0.231-0.241 | 0.149-0.159 | 0.124-0.134 | 0.248-0.268 |
| 2 (#10) | 0.193-0.203 | 0.128-0.138 | 0.105-0.115 | 0.210-0.230 |
| 3 (#9) | 0.175-0.185 | 0.117-0.127 | 0.095-0.105 | 0.190-0.210 |
| 4 (#8) | 0.157-0.167 | 0.100-0.110 | 0.085-0.095 | 0.170-0.190 |
| 5 (#6) | 0.147-0.157 | 0.090-0.100 | 0.062-0.072 | 0.124-0.144 |

With respect to the notching on the initial axial segment of each helical thread 40a, 40b (e.g., the notches along initial axial segment 48a of thread 40a), the notches are of two different types. In the illustrated embodiment, first notches 50a1 have a radial depth d1 that is greater than a radial depth d2 of the second notches 50a2 (e.g., $d2/d1 = 0.45$ to $0.65$, such as $0.55$ to $0.65$), and the angle $\theta 2$ defined by the sides of the first notches 50a1 may be slightly greater than the angle $\theta 3$ defined by the sides of the second notches 50a2 (e.g., $\theta 3/\theta 2 = 0.85$ to $0.95$). Here, each thread turn of the initial axial segment includes more first notches 50a1 than second notches 50a2 (e.g., four first notches 50a1 and three second notches 50a2), where the first and second notches alternate with each other around the thread, except for thread segments (e.g., 40a1) where two first notches 50a1 do not have any second notch therebetween, as a result of the lesser number of second notches 50a2. As used herein, the term "thread turn" refers to a helical extent of the thread that moves angularly through three-hundred sixty degrees about the central axis 26.

As mentioned above, the head end 12 includes a neck section 18 with frustoconical segments 18a and 18b and the head cap 20 defines an annular ledge 22 facing the tapered end 16 and lying in a plane 24 that is perpendicular to a central axis 26 of the shank 14. Here, frustoconical segment 18a runs at an angle or encloses an angle $\theta 5$ relative to the screw axis 26 and frustoconical segment 18b runs at an angle or encloses an angle $\theta 6$ relative to the screw axis, where $\theta 5$ is between thirty-five and fifty degrees (e.g., such as between thirty-seven and forty-three degrees), and $\theta 6$ is between ten and twenty degrees (e.g., such as between twelve and eighteen degrees). The smaller angle $\theta 6$ aids in a radially wider annular ledge or surface 22 (as compared to if frustoconical segment 18a extended all of the way to the head cap) to act as a bearing surface against pullout. In an alternative embodiment, frustoconical segment 18b could be cylindrical.

Figure 23:
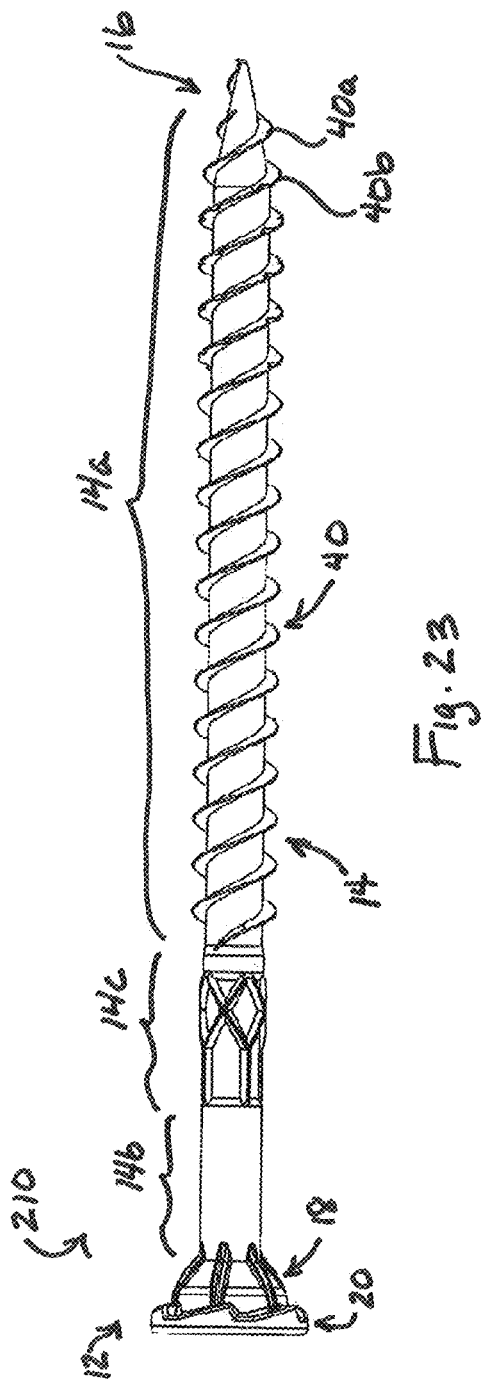
FIGS. 23-31 and 33-34 show another embodiment of a screw.
Figure 24:
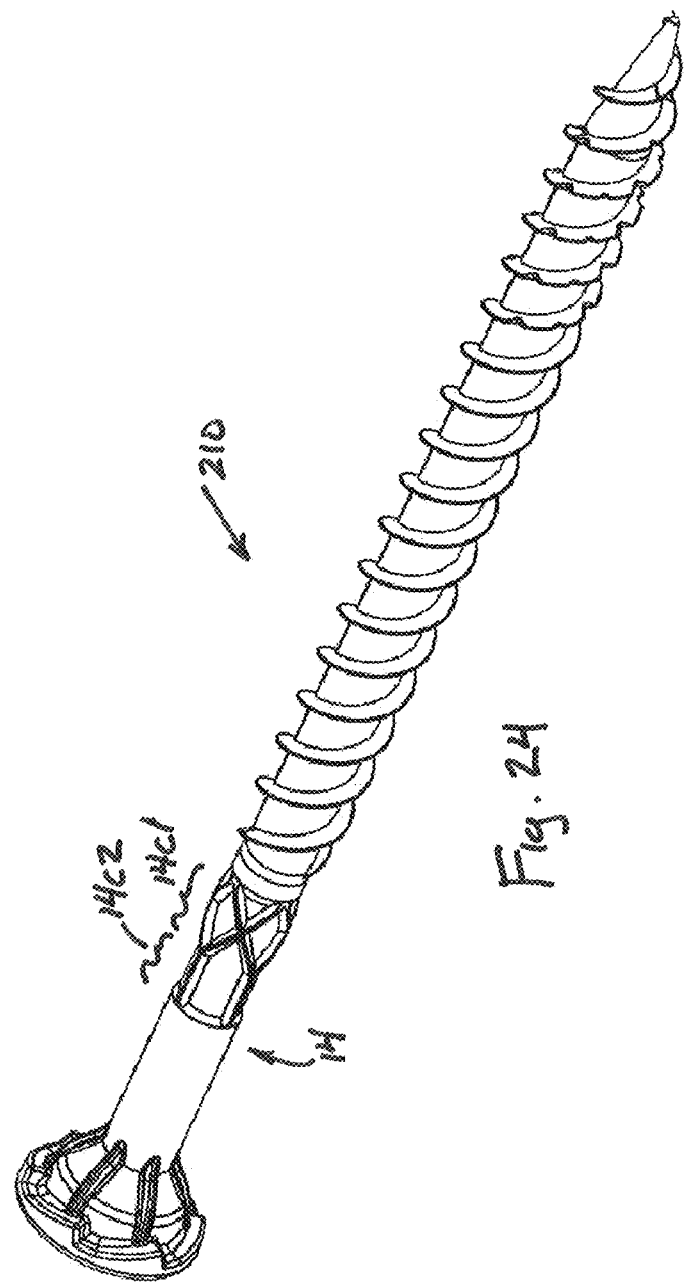
Figure 25:
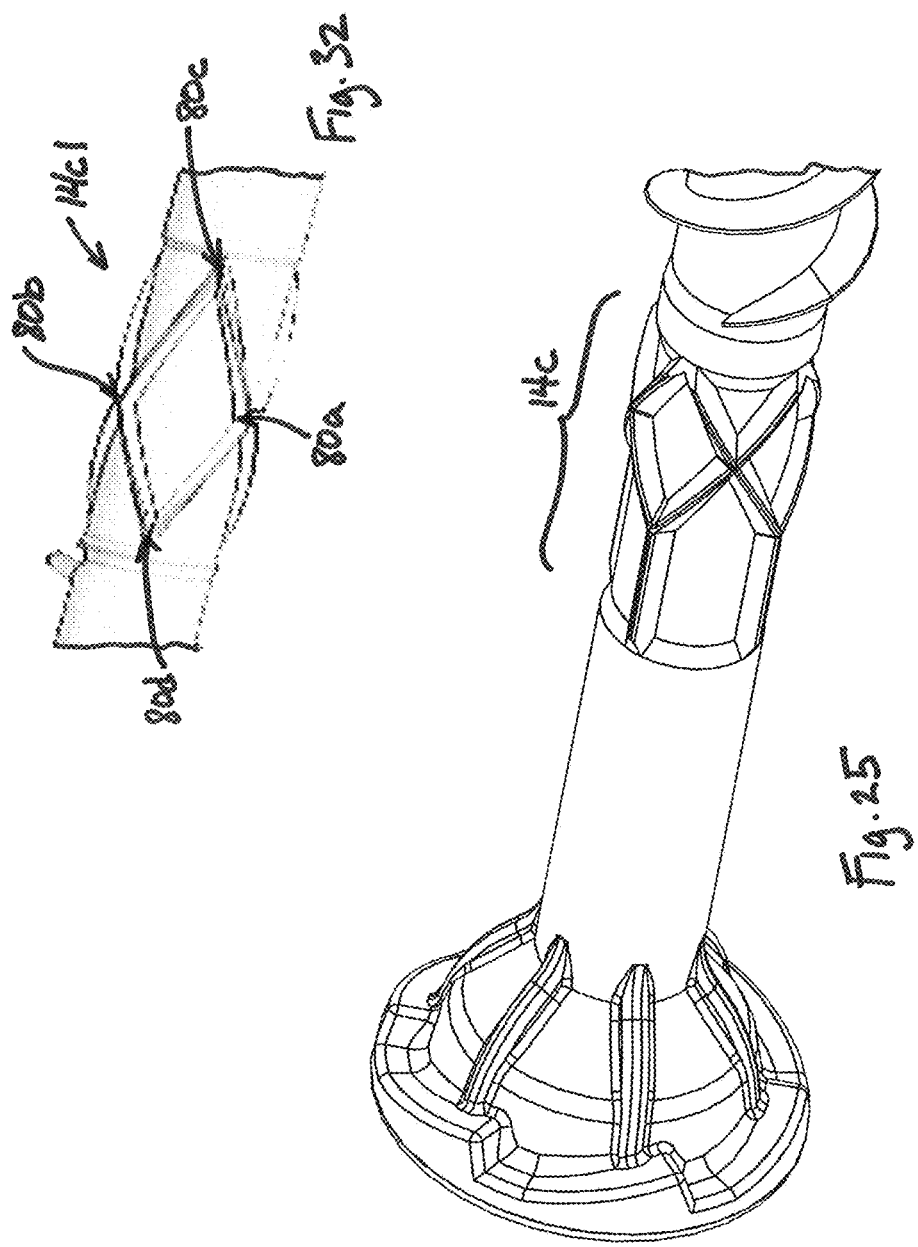
Figure 26:
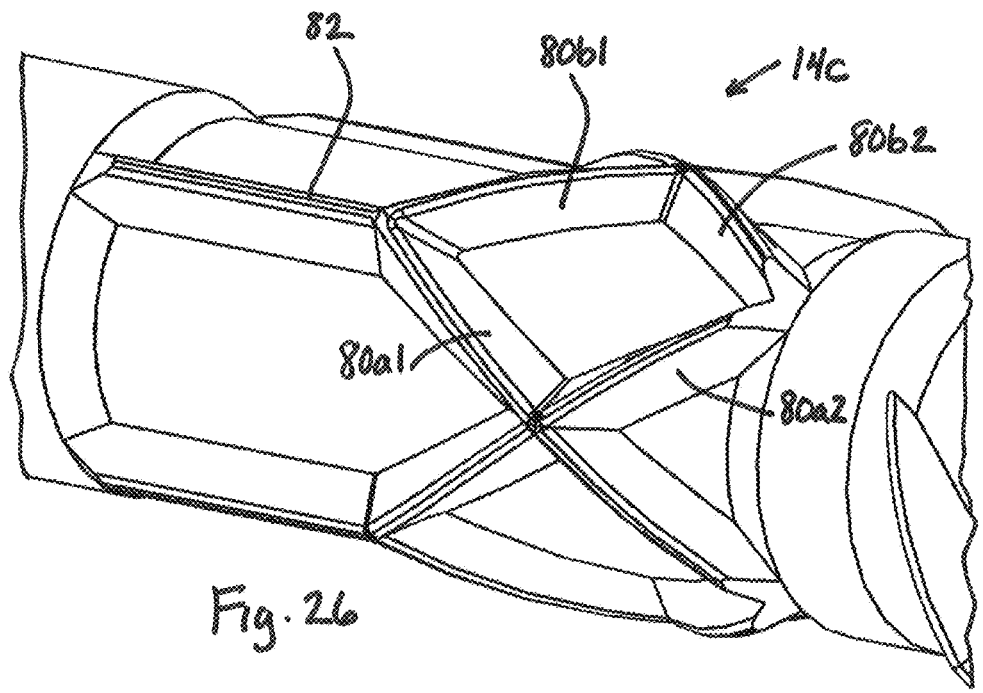
Figure 27:
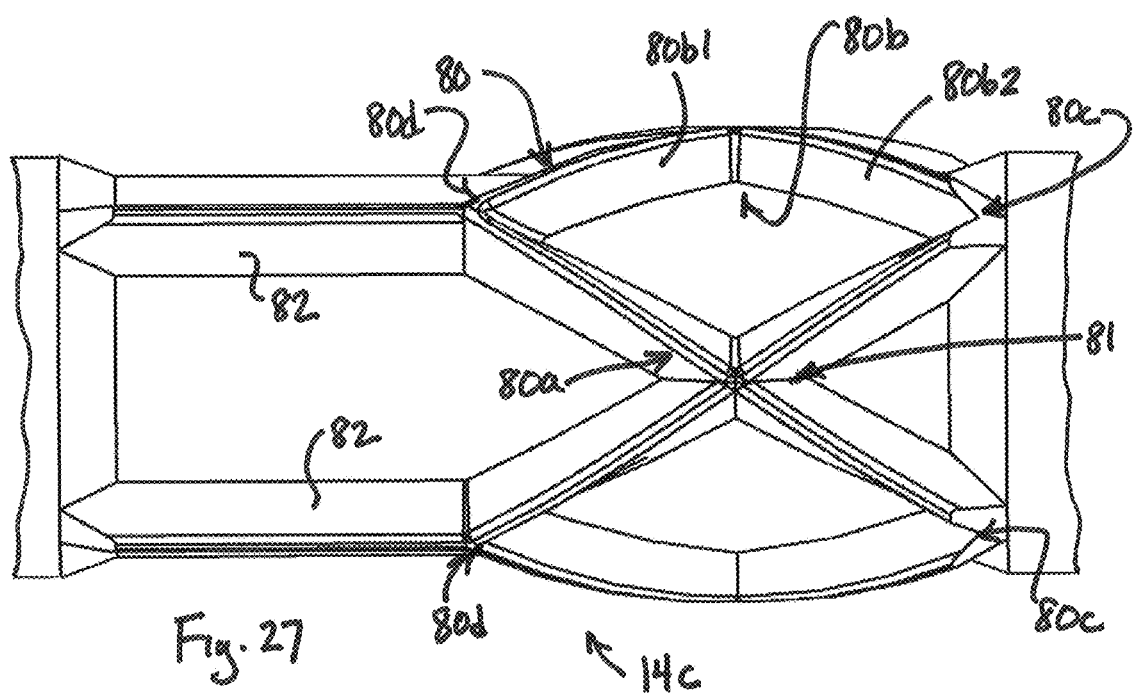
Figure 28:
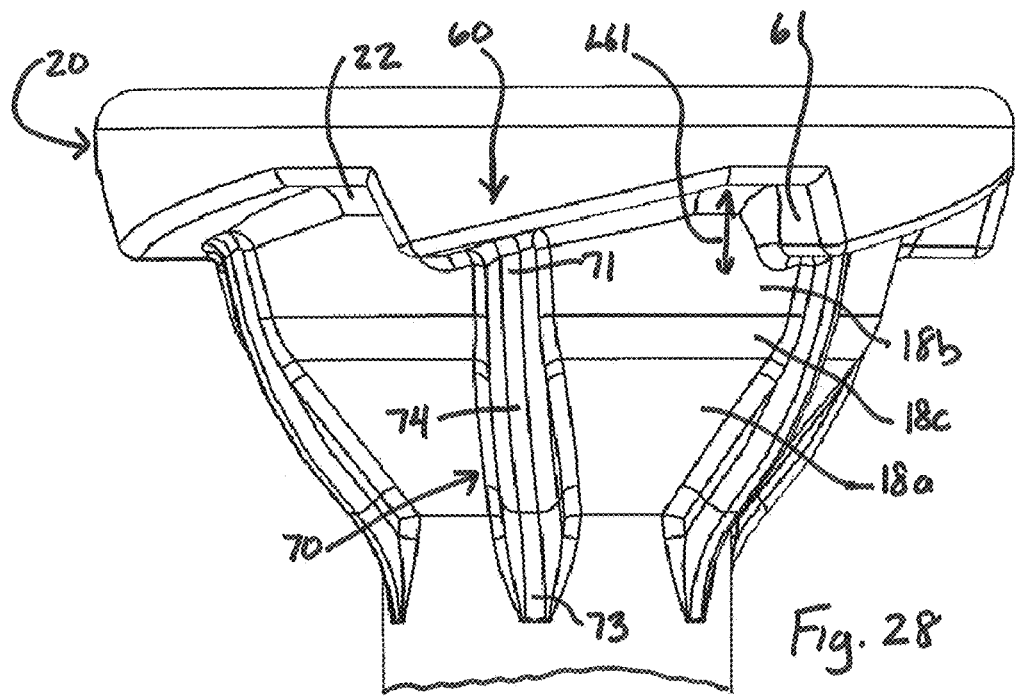
Figure 29:
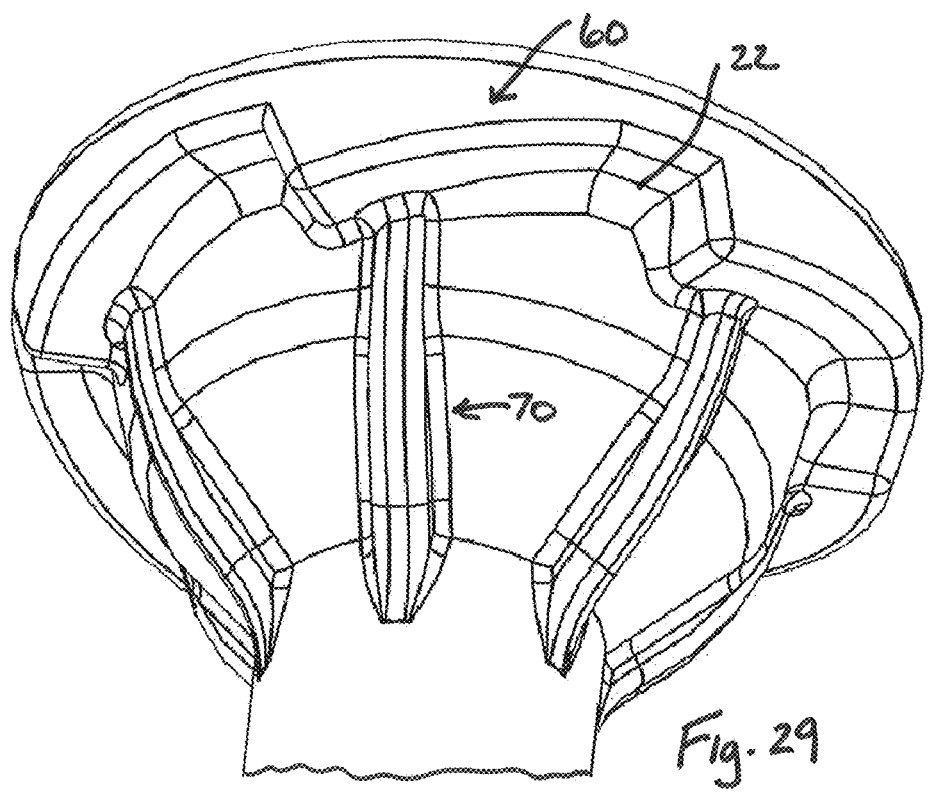
Figure 30:
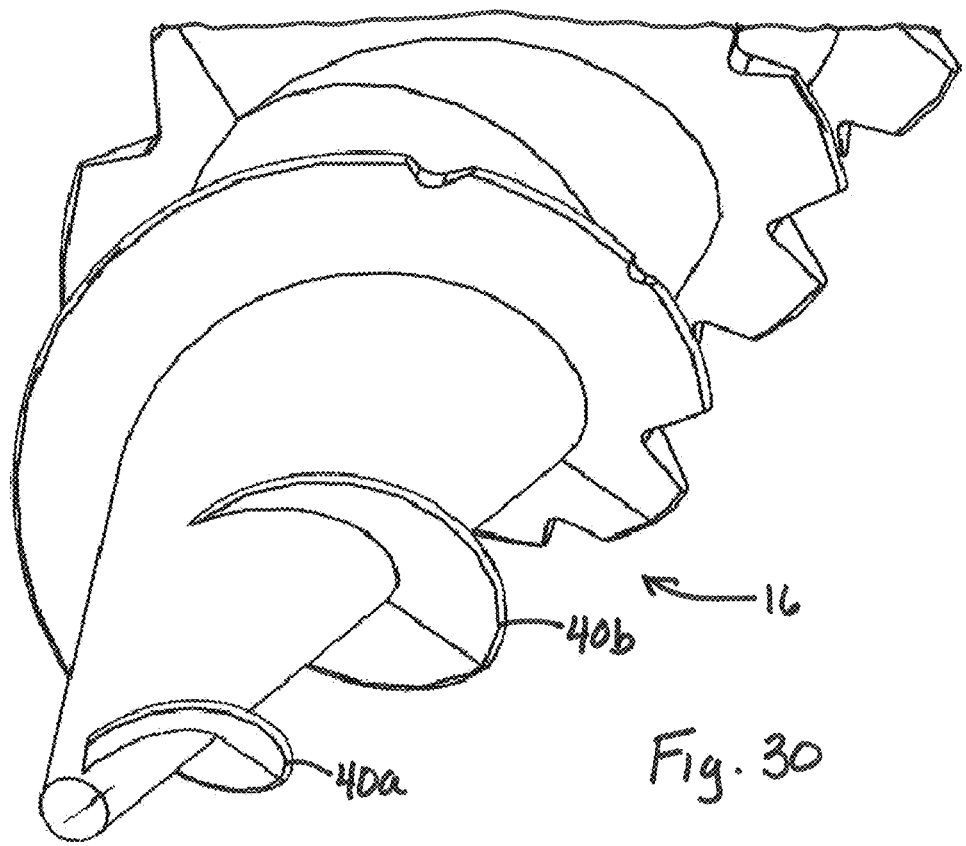
Figure 31:
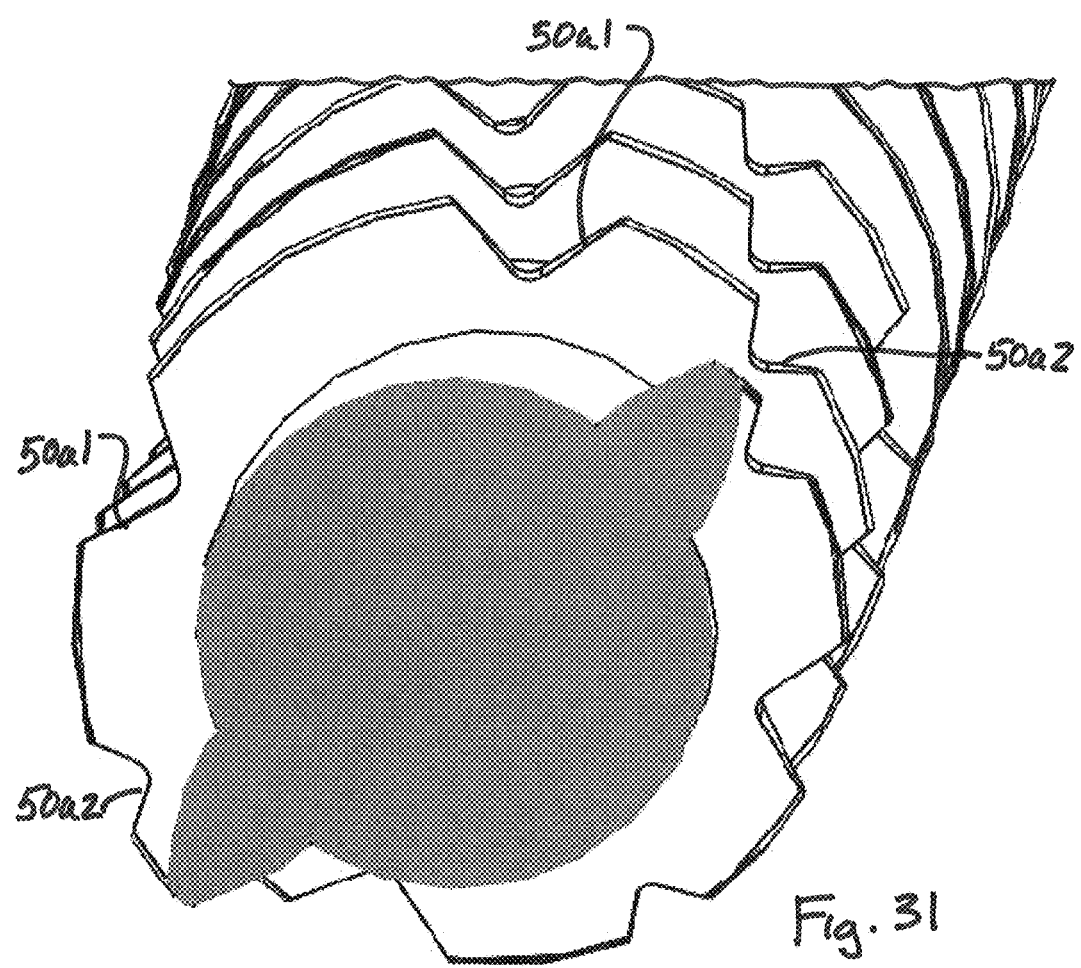
Figure 33:
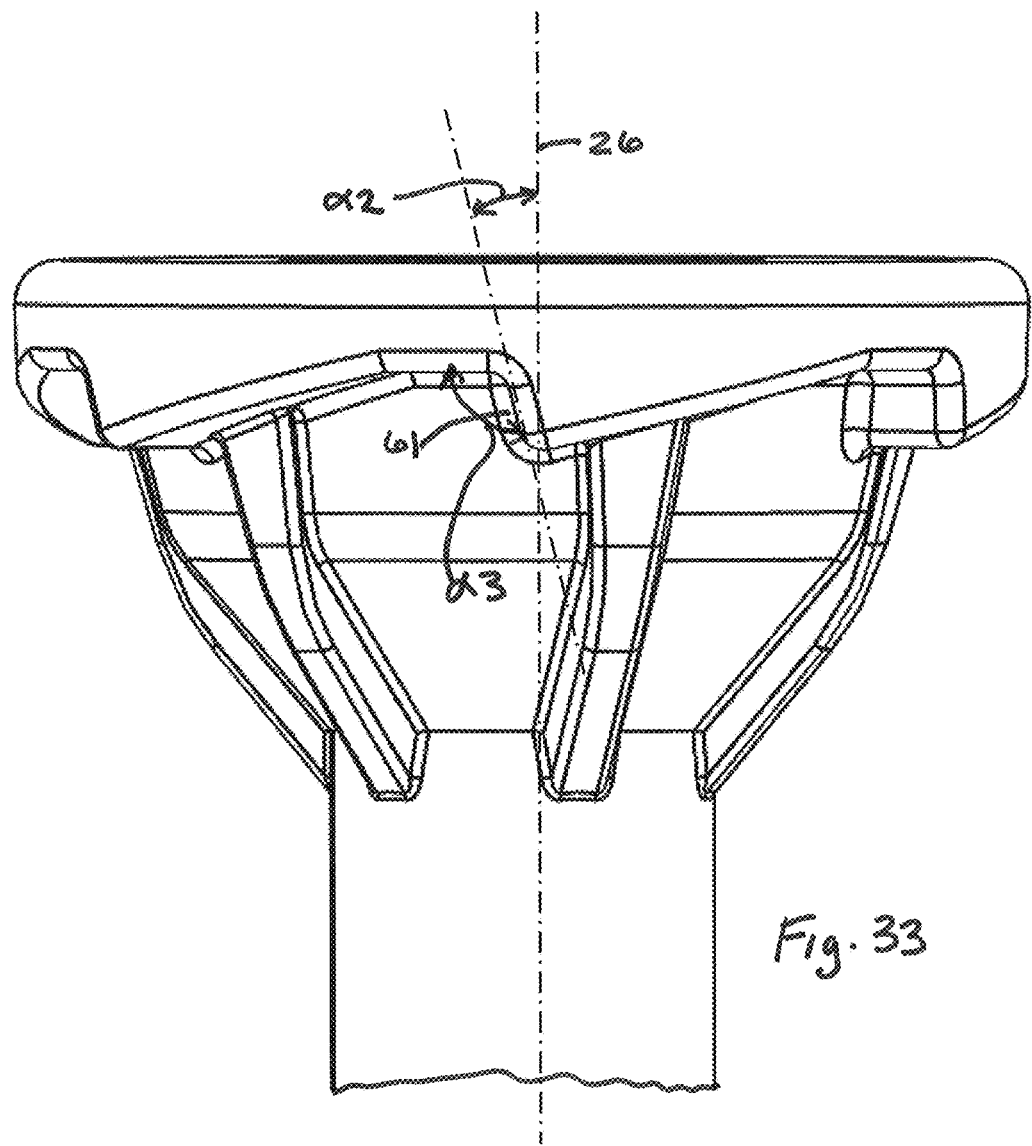
Figure 34:
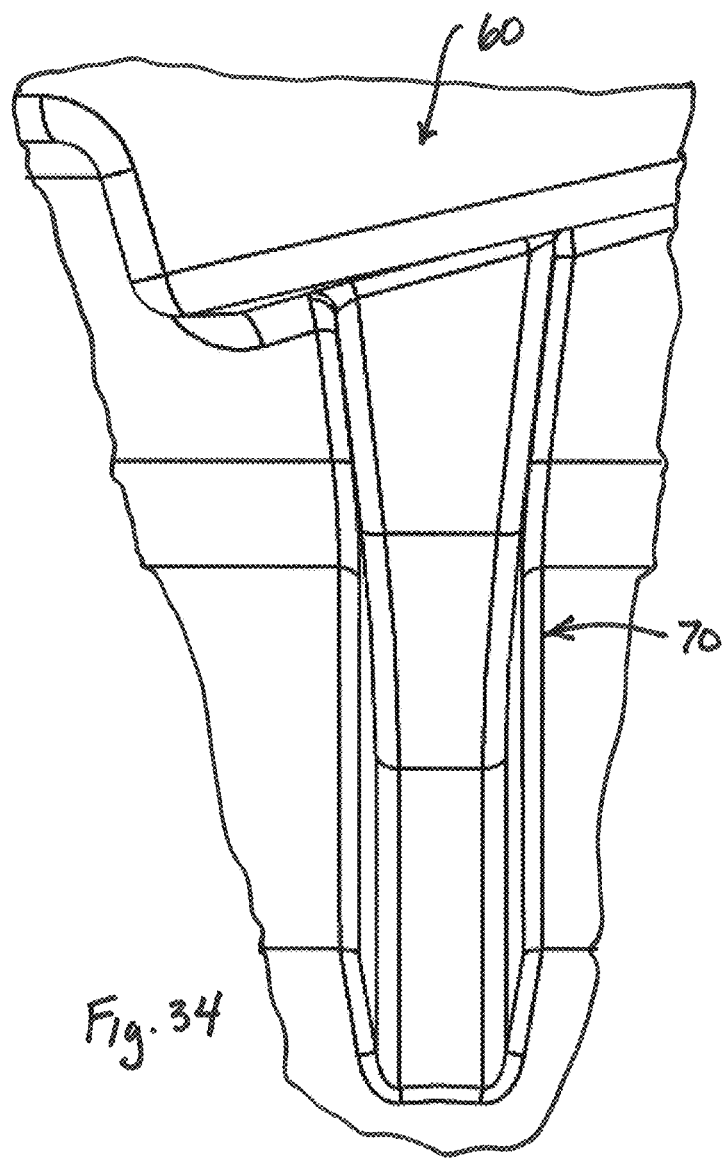

A series of repeating serrations 60 project from the annular ledge 22 toward the tapered end 16 and act as cutting teeth. In the illustrated embodiment, each serration 60 includes a leading face 61 that faces in the direction of rotational install and that runs substantially radially outward from frustoconical segment 18b and may run substantially parallel to the axis of the screw (e.g., lying in a plane in which the screw axis runs). Tooling constraints may result in the face 61 being offset from parallel to the screw axis by as much as five to ten degrees. In other embodiments, the leading face may run substantially perpendicular to the trailing face 62 of the serration. In such a case, and as indicated in FIG. 23, if the serration lead angle defined by the trailing face 62 (see $\theta 4a$ below) is between fifteen and twenty degrees, the leading face 61 may be offset from parallel to the screw axis 26 by an angle that is substantially the same $\theta 4a$. The leading face 61 creates a cutting tooth and, together with trailing face 62, forms a cutting edge 63 on the serration. Embodiments in which the leading face is rotated slightly, so that the radially inner side of the leading face trails the cutting edge 63, per line 65, are also possible, to create a more prominent cutting tooth.

Spacing between the serrations exposes regions of the annular ledge 22. The trailing face 62 of each serration tapers toward the annular ledge or surface 22 at a serration lead angle θ4*a* and serration helix angle θ4*b*, taken at the outside diameter of the serration, that approximates the lead angle or pitch angle θ7*a* and helix angle θ7*b* of the screw thread, where the thread lead angle and helix angle are taken at the radially outer edge of the screw thread. An angle θ4*a* that is equal to the angle θ7*a* provides maximum wood contact under the head that is nearly perpendicular to the screw axis 26 for solid seating of the screw. More specifically, the screw is drawn into the wood at a rate such that the trailing face 62 will substantially follow the cut made by the cutting edge 63. An angle θ4*a* that is slightly less than the angle θ7*a* will cause the trailing face 62 to slightly compress the wood substrate surface cut by the cutting edge 63. An angle θ4*a* that is slightly more than the angle θ7*a* will enable the trailing face 62 allow slight re-expansion of the wood substrate surface cut by the cutting edge 63. Embodiments in which θ4*a*=θ7*a*±12% (such as θ4*a*=θ7*a*±10%), and likewise θ4*b*=θ7*b*±12% (such as θ4*b*=θ7*b*±10%), are preferred, though variations are possible.

In embodiments, the helix angle θ7*b* is between sixty-five and eighty degrees (e.g., such as between seventy and seventy-five degrees), which, in combination with the dimensions specified in Table 1 above, has been found to be beneficial in terms of reducing required energy to drive the screw and at the same time providing good pull-out resistance. Moreover, each of the threads 40*a* and 40*b* are configured such that, at the start end of the thread on the tapered end 16, the radially outer thread edge is low and rapidly rises to its full height to provide a faster start of thread action with the wood. Here, the full thread height is reached within less than seventy percent of one thread turn (e.g., such as within less than sixty percent of one thread or within less than fifty percent of one thread turn). Notably, each thread 40*a* and 40*b* is continuous on the tapered end as it transitions to full thread height because there is no cut on the tapered end that breaks the thread.

In embodiments, the height or axial length L61 of each serration 60 is defined as a function of the number of serrations and the pitch P of the screw. More specifically, embodiments in which L61=P/N60±20% (such as L61=P/N60±15%) are preferred, though variations are possible, where N60 is the number of serrations 60. Generally, the axial length L61 of each serration may be between about 0.0275 inches and about 0.0285 inches, and a ratio of the axial length L61 to the head axial depth d20 is between about 0.68 and 0.75. However, variations are possible, including a range of between 0.45 and 0.75.

Here, each serration 60 includes an associated nib 70 that runs in an axial direction from the trailing face 62 and onto the shank 14. Notably, each nib 70 is aligned with a respective one of the radially outwardly extending drive lobes 28*a*, such that the head end 71 of each nib provides added strength in the vicinity of the drive lobe 28*a*, via increased material thickness adjacent the drive lobe 28*a*. Here, each nib 70 is positioned at a location that, relative to the rotational install direction of the screw, rotationally trails the leading face 61 of its respective serration 60, but embodiments in which the nib is aligned with or leads the face 61 are possible. The head end 71 of each nib joins with the trailing face 62 at a location that is radially inward of the radially outer edge of the trailing face 62, such that the nib does not excessively interfere with the function of the trailing face as it enters the wood material. Here, at least fifty percent (e.g., at least sixty percent or at least seventy percent or at least eighty percent) of the radial thickness T62 of the trailing face 62, at locations circumferentially aligned with the nib 70, remains exposed (that is, remains clear of (i.e., is not connected to) the nib). Here, a depth or height of each nib 70 decreases when moving from the shank end 73 toward the head end 71, and a width of each nib 70, measure at its outer face 74, increases when moving from the shank end 73 toward the head end 71. Here, the shank end 73 is filleted for joinder to the shank 14, but embodiments without such fillets are possible.

Embodiments in which the nibs 70 do not meet with the serrations (e.g., where each nib terminates in the vicinity of region 18*c*) are possible.

The reaming section 14*c* of the screw shank includes a unique projection configuration, formed here by a segment 14*c*1 having a set of circumscribing diamond projections 80 from which straight projections 82 extend to form a segment 14*c*2. Each diamond projection 80 includes a rotationally leading wedge section 80*a*, which points in the direction of rotational install, and a rotationally trailing wedge section 80*b*, which points opposite the direction of rotational install. The rotationally leading side or point of each rotationally leading wedge section 80*a* abuts or is joined to the rotationally trailing side or point of the rotationally trailing wedge section 80*b* of the rotationally preceding diamond-shaped projection, per regions 81. For each diamond projection 80, the rotationally trailing side or open side of the rotationally leading wedge section 80*a* abuts or is joined to the rotationally leading side or open side of the rotationally trailing wedge section 80*b*, per regions 83.

Here, each rotationally leading wedge section 80*a* is formed by converging and intersecting walls 80*a*1 and 80*a*2, which may run helically, and each rotationally trailing wedge section 80*b* is formed by converging and intersecting walls 80*b*1 and 80*b*2, which may run helically, where the walls 80*a*1, 80*a*2, 80*b*1 and 80*b*2 are collectively oriented to define a diamond shape. The internal region 87 of each diamond projection is recessed relative to the walls forming the diamond-projection. In the illustrated embodiment, each straight projection 82 connects to a respective diamond projection 80 and extends substantially parallel to the axis 26 of the screw 10 and toward the head end of the screw. The alternating pattern of rotationally leading wedge sections 80*a* and rotationally trailing wedge sections 80*b* provides advantageous cutting of material during screw installation, and the immediately adjacent straight projections 82 form intermediate pocket regions 85 for handling of material that is cut, to reduce potential resistance to install as a result of cut material binding against the screw. Here, a series of four diamond projections 80 about the circumference of the screw are provided, but the number could vary (e.g., 3 or 5 or 6 or 7 or 8). Here, the length L80 of the diamond projection portion of the reaming section is comparable to the length L82 of the straight projection portion of the reaming section (e.g., L80=L82±35%), but variations are possible. For example, variations in which L80/L82=1.4 to 1.5 are contemplated as potentially beneficial.

Notably, the diamond projection configuration also results in a circumferential series of axially leading wedge sections 80*c*, which point toward the tip end of the screw, and a circumferential series of axially trailing wedge sections 80*d*, which point toward the head end of the screw. The open side of each axially leading wedge section 80*c* abuts against the open side of one of the axially trailing wedge sections 80d. Here, each axially leading wedge section 80c is formed by converging and intersecting walls (e.g., 80a2 and 80b2), and each rotationally trailing wedge section 80b is formed by converging and intersecting walls (e.g., 80b1 and 80a1).

It is to be clearly understood that the above description is intended by way of illustration and example only, is not intended to be taken by way of limitation, and that other changes and modifications are possible.

Figure 15A:
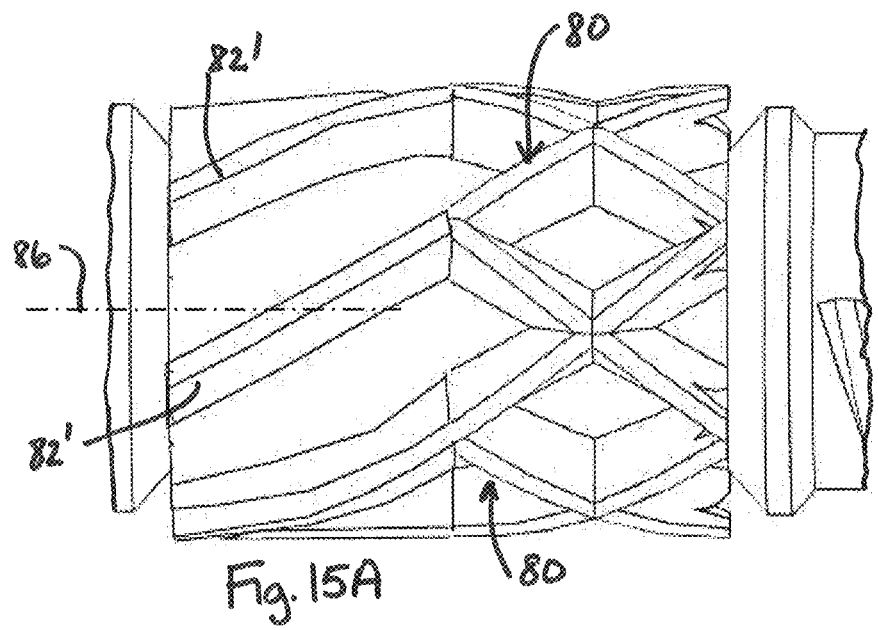
FIGS. 15A and 15B show respective alternative embodiments of the first segment of the reaming section.
Figure 15B:
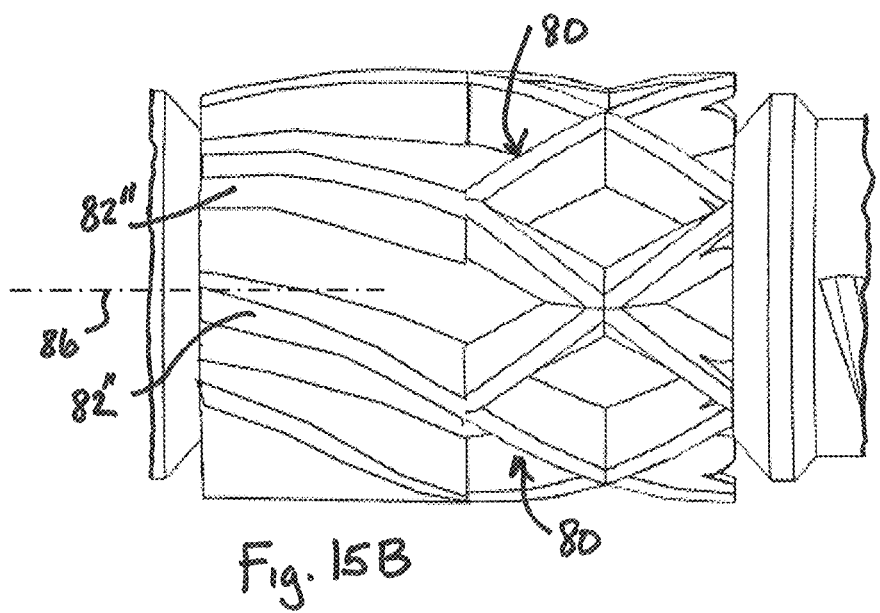

Referring to FIGS. 15A and 15B, alternative embodiments of the reaming section are shown, in which the projections 82', 82" extending from the diamond projections are skewed relative to the axis 86 of the screw. Here, projections 82' run from the diamond projections 80 toward the head of the screw and in a direction that is with the rotational install direction of the screw, and the projections 82" run from the diamond projections 80 toward the head of the screw and in a direction that is counter to the rotational install direction of the screw. The general path of the projections 82' and 82" may be a helical path.

Figure 16:
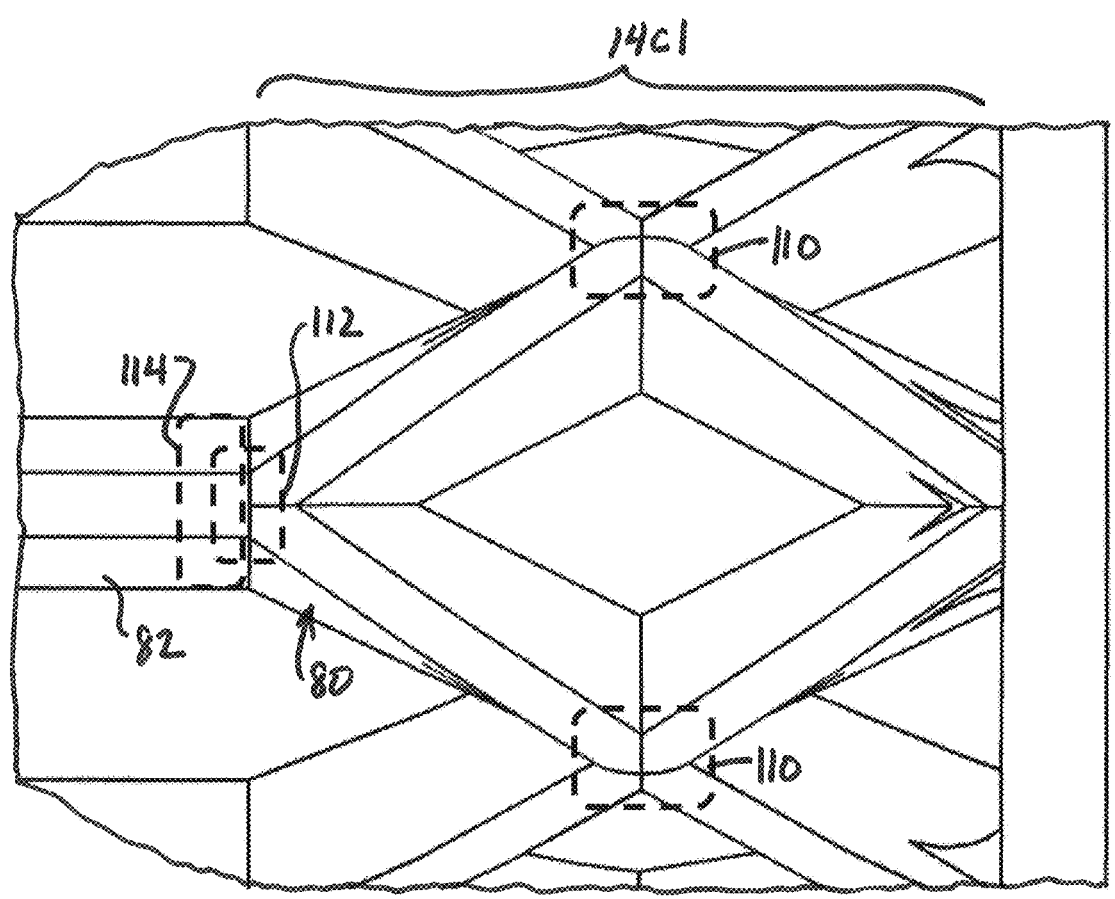
FIG. 16 shows a further alternative embodiment of the reaming section.

Referring to FIG. 16, embodiments in which dashed regions 110 or 112 are slightly recessed relative to the surrounding projection walls, or slightly raised relative to the surrounding projection walls are possible. In both such cases, the projection walls are still interconnected. Moreover, embodiments in which dashed region 114 is provided without any projection wall, to provide a slight gap between the diamonds 80 and the straights 82, are also possible, and in such cases the straights 82 would still be deemed to extend from the first segment 14c1 toward the head end.

Figure 17:
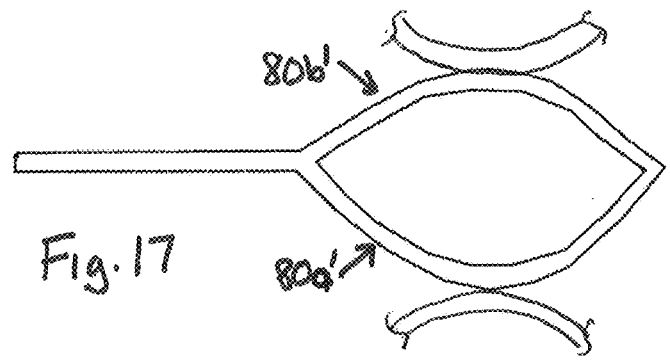

Embodiments in which the rotationally leading and trailing wedge sections 80a' and 80b' are more curved, such that the apexes of each leading and trailing wedge are curved, are also possible, as schematically indicated in FIG. 17. In another variation, the rotationally leading and trailing wedge sections 80a" and 80b" include a short linear region at the locations 81 where the apexes of the wedge sections meet, per FIG. 17A.

Figure 18:
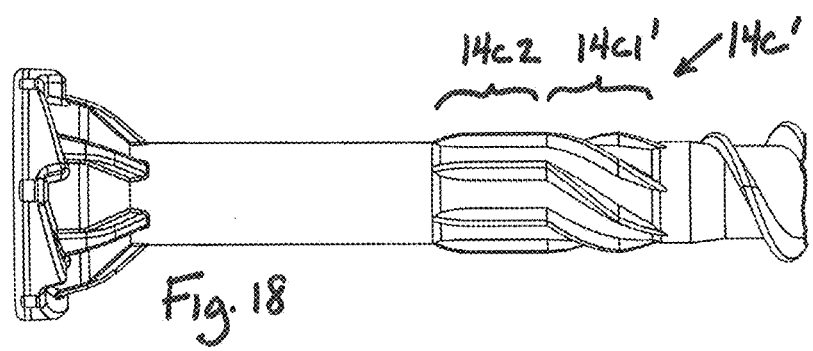

Per FIG. 18, a reaming section 14c' in which the axially leading segment 14c1' of the reaming section includes only helically extending projections 186, running in the direction of rotational install when moving from segment 14c2 toward the tapered end of the screw, are possible. Segment 14c2 includes linear or substantially linear running projections, which run substantially parallel to the screw axis.

Figure 19:
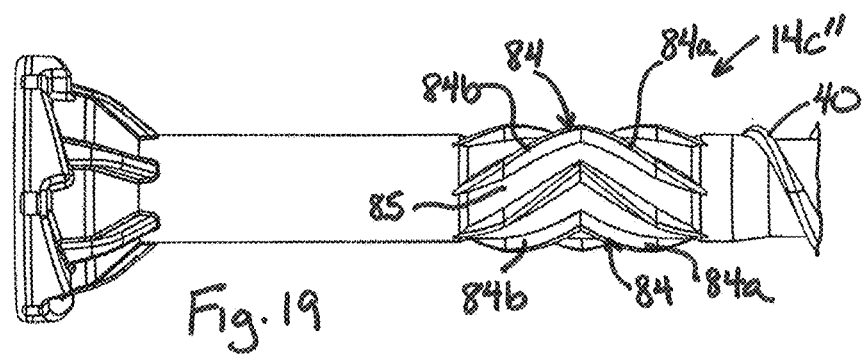

Per FIG. 19, a reaming section 14c'' in which all projections 84 are formed as trailing wedges, with circumferential spacing 85 therebetween (such that the projections do not contact each other), is also possible. Here, axially leading portions 84a of the projections run helically in the same direction as the screw thread 40, and axially trailing portions 84b of the projections run helically in the opposite direction.

Figure 20:
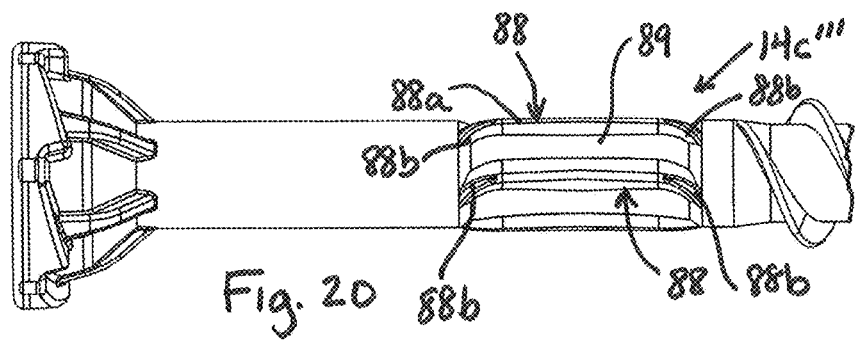

Per FIG. 20, a reaming section 14c''' in which all projections 88 are arch-shaped, with arch top wall portions 88a, which here run substantially parallel to the screw axis. Each arch top wall portion 88a interconnects arch sidewall portions 88b that both extend away from the arch top wall portion 88a and in the direction of rotational install, with the open side 88c of the arch-shape facing in the rotational install direction, and with a circumferential spacing 89 between the projections, is also possible.

Figure 21A:
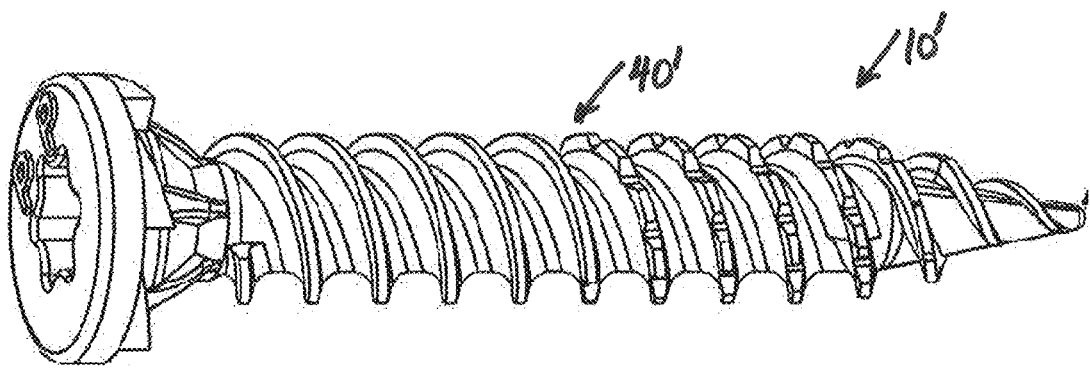
FIGS. 21A-21B show a screw embodiment without a reaming section.
Figure 21B:
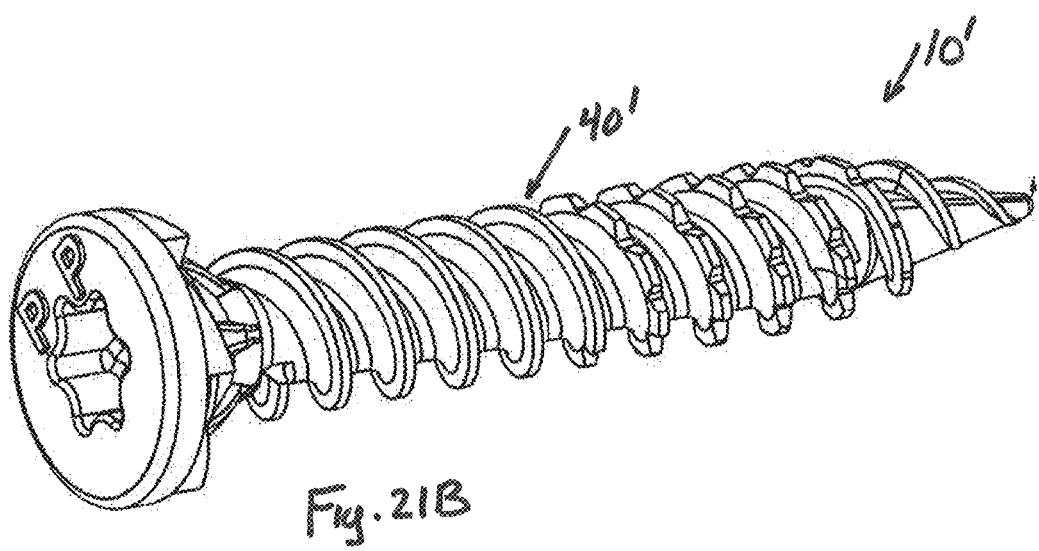

Per FIGS. 21A and 21B, embodiments in which the reaming section of the screw is absent are possible. Here, screw 10' includes a thread 40' comparable to the thread of screw 10 described above, except that the thread 40' extends all the way to the neck section of the screw. The screw 10' also includes serrations and nibs similar to that described above for screw 10.

Figure 22:
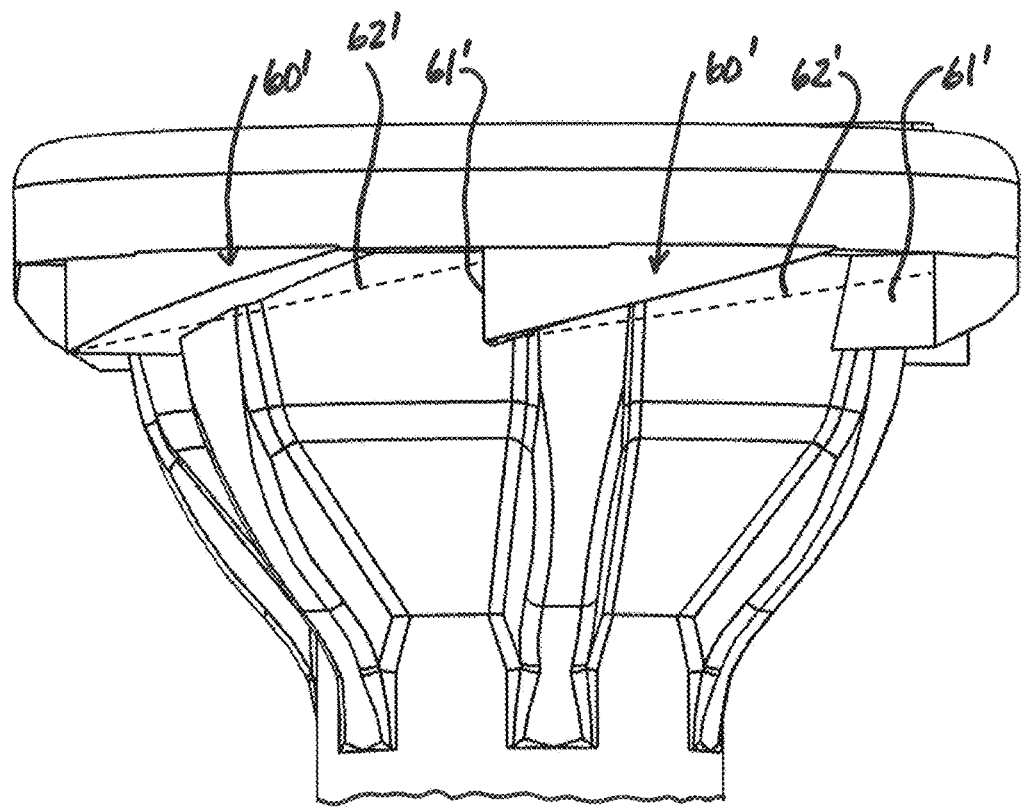
FIG. 22 shows a potential alternative head configuration in which the serrations at the underside of the head join with each other.

Per FIG. 22, in an alternative embodiment of the head, the serrations 60's may be configured such that the trailing face 62' (represented in dashed line form) of each serration extends all the way to the leading face 61' of the following serration (relative to the rotational install direction). In such a configuration, the annular face at the underside of the head would, effectively be eliminated in its entirety.

Referring to FIGS. 23-31 and 33-34, a screw 210 is shown, which is very similar to above-described screw 10, with like numerals depicting like parts. Except as otherwise specified, the features of screw 210 are the same as screw 10 described above. Screw 210 is slightly more refined than screw 10 in the reaming section 14c and the head nib section. In particular, the projections (e.g., 80a1, 80a2, 80b1, 80b2 and 82) in the reaming section 14 have distal edges that are slightly curved and/or or have only a very small flat at the top. Embodiments in which the distal edges are sharper (e.g., no curve or flat) are also possible. Similarly, the contour and shape of the nibs 70 at the underside of the head cap 20 are more tapered on the leading and trailing sides than in the case of screw 10. Here, the leading face 61 of each serration is angularly offset from the screw axis 26 by an angle α2 of between about ten and thirty degrees (e.g., between ten and twenty degrees), such that the leading face encloses an obtuse angle α3 (of between about one-hundred and one-hundred twenty degrees (e.g., between one-hundred and one-hundred ten degrees) with the annular ledge 22.

Referring to FIG. 32, an alternative reaming section is shown and is made up of only segment 14c1. In such embodiments, the axial length of segment 14c1 may, in some cases, be lengthened, to result in the configuration shown in FIG. 32, with a pattern of rotationally leading wedge projections 80a and rotationally trailing wedge projections 80b, and axially leading wedge projections 80c opposite axially trailing wedge projections 80d.

Embodiments in which any reaming section described above is implemented on a screw with a single lead thread, are also contemplated.

Still other variations are possible.

The invention claimed is:

1. A wood screw, comprising:
   a head end, a shank and a tapered end, the head end including a tool engaging part, the head end located at a first end of the shank and the tapered end located at a second end of the shank;
   a thread formed along the shank, wherein the thread begins on the tapered end, extends onto the shank and toward the head end; and
   wherein the head end includes a neck running from the first end of the shank to a head cap, wherein the head cap includes an end face and includes an underside facing the tapered end and defining an annular ledge, wherein the annular ledge faces the tapered end and lies in a plane that is perpendicular to a central axis of the shank, wherein the underside includes a plurality of serrations extending from the annular ledge, each serration having a leading face and a trailing face that define a cutting edge, wherein the trailing face of each serration tapers away from the tapered end and into the annular ledge such that the serrations are spaced apart from each other by circumferentially extending regions of the annular ledge;
   wherein the head cap has an axial depth from the end face to the annular ledge and each serration has a maximum axial projection dimension away from the annular ledge, wherein a ratio of the maximum axial projection dimension to the axial depth is between about 0.68 and 0.75;

wherein the trailing face of each serration tapers toward the annular ledge at an angle, relative to the plane, that is within ±12% of a pitch angle defined by the thread.

2. The wood screw of claim 1, wherein the maximum axial projection dimension is between 0.0275 inches and 0.0285 inches.

3. The wood screw of claim 1, wherein the head end further includes a plurality of nibs running from the shank and along the neck toward the serrations.

4. The wood screw of claim 3, where each nib runs substantially parallel to a central axis of the screw and abuts the trailing face of one of the serrations.

5. The wood screw of claim 3, wherein each nib abuts the trailing face of one of the serrations and is configured such that at least fifty percent of a radial thickness of the trailing face in alignment with the nib remains exposed.

6. The wood screw of claim 1, wherein the thread is a dual start thread formed by a first thread and a second thread, wherein the first thread begins on the tapered end and the second thread begins on the tapered end.

7. The wood screw of claim 6, wherein a height of the first thread transitions from a starting height to its full thread height within less than seventy percent of one thread turn, and the height of the second thread transitions from a starting height to its full thread height within less than seventy percent of one thread turn.

8. The wood screw of claim 7, where the first thread is continuous in a helical extent of transition between its start height and its full thread height, and the second thread is continuous along a helical extent of transition between is start height and its full thread height.

9. The wood screw of claim 1, wherein the thread includes a peripheral edge, and an initial axial segment comprising multiple thread turns and along which the peripheral edge includes a plurality of notches, and a following axial segment comprising multiple thread turns and along which the peripheral edge lacks any notches, wherein the plurality of notches along the initial axial segment includes first notches having a first radial depth and second notches having a second radial depth that is less than the first radial depth.

10. The wood screw of claim 1:
wherein the thread terminates at a first axial location along the shank that is spaced from the head end;
wherein a reaming section is located along the shank and runs from proximate to the first axial location and toward the head end, the reaming section including projections thereon, wherein the reaming section comprises a first segment with a repeating pattern of rotationally leading wedge projections alternating with rotationally trailing wedge projections;
wherein the reaming section further comprises a second segment with (i) a set of circumferentially spaced apart linear projections abutting and extending from the first segment toward the head end or (ii) a set of circumferentially spaced apart helical projections abutting and extending from the first segment toward the head end.

11. The wood screw of claim 1,
wherein the thread terminates at a first axial location along the shank that is spaced from the head end;
wherein a reaming section is located along the shank and runs from proximate to the first axial location and toward the head end, the reaming section including projections thereon, wherein the reaming section comprises:
an axially leading segment and an axially trailing segment, wherein the axially leading segment includes only helically running projections, running in a direction of rotational install when moving from the axially trailing segment toward the tapered end, wherein the axially trailing segment includes a set of circumferentially spaced apart linear projections extending from the axially leading segment toward the head end; or
a set of circumferentially spaced apart projections each formed as a trailing wedge that has its apex facing or pointing in a direction opposite a direction of rotational install, with circumferential spacing therebetween such that the projections do not contact each other; or
a set of circumferentially spaced apart arch-shaped projections, with spaced apart sidewall portions interconnected by a substantially linear portion, with an open side of each arch-shaped projection facing in a direction of rotational install.

12. A wood screw, comprising:
a head end, a shank and a tapered end, the head end including a tool engaging part, the head end located at a first end of the shank and the tapered end located at a second end of the shank;
a thread formed along the shank, wherein the thread begins on the tapered end, extends onto the shank and toward the head end; and
wherein the thread includes a peripheral edge, and an initial axial segment comprising multiple thread turns and along which the peripheral edge includes a plurality of notches, and a following axial segment comprising multiple thread turns and along which the peripheral edge lacks any notches, wherein the plurality of notches along the initial axial segment includes first notches having a first radial depth and second notches having a second radial depth that is less than the first radial depth;
wherein an angle defined by sides of the first notches is greater than an angle defined by sides of the second notches.

13. A wood screw, comprising:
a head end, a shank and a tapered end, the head end including a tool engaging part, the head end located at a first end of the shank and the tapered end located at a second end of the shank;
a thread formed along the shank, wherein the thread begins on the tapered end, extends onto the shank and toward the head end; and
wherein the head end includes a neck running from the first end of the shank to a head cap, wherein the head cap includes an underside facing the tapered end and defining an annular ledge, wherein the annular ledge faces the tapered end and lies in a plane that is perpendicular to a central axis of the shank, wherein the underside includes a plurality of serrations extending from the annular ledge, each serration having a leading face and a trailing face that define a cutting edge, wherein the trailing face of each serration tapers away from the tapered end and into the annular ledge such that the serrations are spaced apart from each other by circumferentially extending regions of the annular ledge, wherein the trailing face of each serration tapers toward the annular ledge at an angle, relative to the plane, that is within ±12% of a pitch angle defined by the thread.

14. A wood screw, comprising:
a head end, a shank and a tapered end, the head end including a tool engaging part, the head end located at a first end of the shank and the tapered end located at a second end of the shank;
a thread formed along the shank, wherein the thread begins on the tapered end, extends onto the shank and toward the head end; and
wherein the head end includes a neck running from the first end of the shank to a head cap, wherein the head cap includes an underside facing the tapered end and defining an annular ledge, wherein the annular ledge faces the tapered end and lies in a plane that is perpendicular to a central axis of the shank, wherein the underside includes a plurality of serrations extending from the annular ledge, each serration having a leading face and a trailing face that define a cutting edge, wherein the trailing face of each serration tapers away from the tapered end and into the annular ledge such that the serrations are spaced apart from each other by circumferentially extending regions of the annular ledge;
wherein the head end further includes a plurality of nibs running from the shank and along the neck toward the serrations, wherein each nib runs substantially parallel to a central axis of the screw and abuts the trailing face of one of the serrations at a location that is closer to the leading face of the serration than to a point where the trailing face meets the annular ledge.

15. The wood screw of claim 14, wherein the neck includes a first frustoconical segment running from the shank to an axial location spaced from the annular ledge, wherein the neck includes a second frustoconical segment running from the annular ledge toward the axial location.

16. The wood screw of claim 15, wherein each nib extends along both the first frustoconical segment and the second frustoconical segment, wherein each serration abuts and runs along part of the second axial segment.

17. The wood screw of claim 15, wherein the first frustoconical segment encloses a first angle relative to the central axis, the second frustoconical segment encloses a second angle relative to the central axis, wherein the first angle is between thirty-five and fifty degrees and the second angle is between ten and twenty degrees.

* * * * *